US012307576B2

(12) United States Patent
Lakshminarayana et al.

(10) Patent No.: US 12,307,576 B2
(45) Date of Patent: May 20, 2025

(54) NEURAL NETWORKS TO RENDER TEXTURED MATERIALS ON CURVED SURFACES

(71) Applicants: Adobe Inc., San Jose, CA (US); The Regents of the University of California, Oakland, CA (US)

(72) Inventors: Krishna Bhargava Mullia Lakshminarayana, San Francisco, CA (US); Zexiang Xu, San Jose, CA (US); Milos Hasan, Lafayette, CA (US); Fujun Luan, San Jose, CA (US); Alexandr Kuznetsov, San Diego, CA (US); Xuezheng Wang, San Diego, CA (US); Ravi Ramamoorthi, Carlsbad, CA (US)

(73) Assignees: Adobe Inc., San Jose, CA (US); The Regents of the University of California, Oakland, CA (US)

( * ) Notice: Subject to any disclaimer, the term of this patent is extended or adjusted under 35 U.S.C. 154(b) by 133 days.

(21) Appl. No.: 17/993,854

(22) Filed: Nov. 23, 2022

(65) Prior Publication Data
US 2024/0169653 A1      May 23, 2024

(51) Int. Cl.
*G06T 15/06* (2011.01)
*G06T 15/04* (2011.01)
*G06T 15/50* (2011.01)

(52) U.S. Cl.
CPC ............. *G06T 15/06* (2013.01); *G06T 15/04* (2013.01); *G06T 15/506* (2013.01); *G06T 2215/12* (2013.01)

(58) Field of Classification Search
CPC ....... G06T 15/06; G06T 15/04; G06T 15/506; G06T 2215/12
See application file for complete search history.

(56) References Cited

U.S. PATENT DOCUMENTS

| 7,430,490 B2* | 9/2008 | Tong ....................... G06T 15/04 702/158 |
| 11,816,779 B2 | 11/2023 | Lakshminarayana et al. |
| 2019/0043242 A1 | 2/2019 | Risser |

(Continued)

OTHER PUBLICATIONS

M. Yengui, et al., "Simulated bidirectional texture functions with Silhouette details", Proceedings of the Graphics Interface 2013, Toronto, Ont., Canada, May 2013. p. 45-54, at https://dl.acm.org/doi/pdf/10.5555/2532129.2532139 (Year: 2013).*

(Continued)

*Primary Examiner* — Jin Cheng Wang
(74) *Attorney, Agent, or Firm* — Kilpatrick Townsend & Stockton LLP

(57) ABSTRACT

A scene modeling system accesses a three-dimensional (3D) scene including a 3D object. The scene modeling system applies a silhouette bidirectional texture function (SBTF) model to the 3D object to generate an output image of a textured material rendered as a surface of the 3D object. Applying the SBTF model includes determining a bounding geometry for the surface of the 3D object. Applying the SBTF model includes determining, for each pixel of the output image, a pixel value based on the bounding geometry. The scene modeling system displays, via a user interface, the output image based on the determined pixel values.

17 Claims, 10 Drawing Sheets

(56) References Cited

U.S. PATENT DOCUMENTS

| | | | |
|---|---|---|---|
| 2019/0236830 A1 | 8/2019 | Akenine-Moller et al. | |
| 2023/0237738 A1* | 7/2023 | Rump | G06V 10/141 345/419 |
| 2023/0260193 A1* | 8/2023 | Rump | G06T 5/70 345/419 |
| 2023/0316627 A1* | 10/2023 | Lanfer | G06T 11/001 345/582 |
| 2023/0343051 A1* | 10/2023 | Rump | G06F 3/011 |

OTHER PUBLICATIONS

J. Wang, et. et., "Capturing and Rendering Geometry Details for BTF mapped surfaces", the Visual Computer, Aug. 31, 2005, vol. 21, pp. 559-568 (Year: 2005).*
A. Kuznetsov, et al., "NeuMIP: Multi-resolution Neural Materials", ACM Transactions on Graphics (TOG), vol. 40, No. 4, Jul. 19, 2021, pp. 1-13 (Year: 2021).*
A. Kuznetsov, et al., "Rendering Neural Materials on Curved Surfaces", SIGGRAPH '22 Conf. Proc., Aug. 7-11, 2022, Vancouver, BC, Canada, pp. 1-12 (Year: 2022).*
Mitsuba 3, Mitsuba Renderer, Available Online at: http://www.mitsuba-renderer.org., 2010, 1 page.
Principal Curvature, Available Online at: https://en.wikipedia.org/wiki/Principal_curvature, Accessed from Internet on Jun. 12, 2023, 3 pages.
Substance Source Library, Available Online at: https://source.substance3d.com, Accessed from Internet on Jun. 12, 2023, 8 pages.
U.S. Appl. No. 17/538,311, Notice of Allowance mailed on Mar. 23, 2023, 20 pages.
Baatz et al., NeRF-Tex: Neural Reflectance Field Textures, Eurographics Symposium on Rendering—DL-Only Track, Adrien Bousseau and Morgan McGuire (Eds.), vol. 40, No. 4, Jun. 22, 2021, pp. 1-13.
Dana et al., Reflectance and Texture of Real-World Surfaces, ACM Transactions on Graphics, vol. 18, No. 1, Jan. 1999, pp. 1-34.
Dufort et al., Interactive Rendering of Meso-Structure Surface Details using Semi-Transparent 3D Textures, In Proceeding of Vision, Modeling and Visualization, Nov. 16-18, 2005, 9 pages.
Dupuy et al., Linear Efficient Antialiased Displacement and Reflectance Mapping, ACM Transactions on Graphics, vol. 32, No. 6, Nov. 2013, pp. 211:1-121:11.
Fan et al., Neural BRDFs: Representation and Operations, ACM Transactions on Graphics, vol. 1, No. 1, Nov. 2021, 13 pages.
Filip et al., Bidirectional Texture Function Modeling: A State of the Art Survey, IEEE Transactions on Pattern Analysis and Machine Intelligence, vol. 31, No. 11, Nov. 2009, pp. 1921-1940.
Han et al., Frequency Domain Normal Map Filtering, ACM Transactions on Graphics, vol. 26, No. 3, Jul. 2007, pp. 28-1-28-11.
Jacob et al., Discrete Stochastic Microfacet Models, ACM Transactions on Graphics, vol. 33, No. 4, Jul. 2014, 10 pages.
Jacob, Mitsuba2: Physically Based Renderer, Available Online at: http://www.mitsuba-renderer.org/, Accessed from Internet on Dec. 1, 2021, 1 page.
Jacobson et al., Fibigl—A simple C++ Geometry Processing Library, Available Online at: https://libigl.github.io/, Accessed from Internet on Jun. 12, 2023, 7 pages.
Kaneko et al., Detailed Shape Representation with Parallax Mapping, In Proceedings of the ICAT, Dec. 5-7, 2001, 4 pages.
Kaplanyan et al., Filtering Distributions of Normals for Shading Antialiasing, Proceedings of High Performance Graphics, Jun. 2016, 12 pages.
Koudelka et al., Acquisition, Compression, and Synthesis of Bidirectional Texture Functions, In 3rd International Workshop on Texture Analysis and Synthesis, Jan. 2003, 5 pages.
Kuznetsov et al., Learning Generative Models for Rendering Specular Microgeometry, ACM Transactions on Graphics, vol. 38, No. 6, Nov. 2019, pp. 225:1-225:14.
Kuznetsov et al., NeuMIP: Multi-Resolution Neural Materials, ACM Transactions on Graphics, vol. 40, No. 4, Article 175, Aug. 2021, pp. 1-13.
Kuznetsov et al., Rendering Neural Materials on Curved Surfaces, In Special Interest Group on Computer Graphics and Interactive Techniques Conference Proceedings, Aug. 7-11, 2022, 9 pages.
Maximov et al., Deep Appearance Maps, Proceedings of the IEEE/CVF International Conference on Computer Vision, Oct. 29, 2019, 10 pages.
Mildenhall et al., NeRF: Representing Scenes as Neural Radiance Fields for View Synthesis, European Conference on Computer Vision, Aug. 3, 2020, pp. 1-25.
Muller et al., Compression and Real-Time Rendering of Measured BTFs Using Local PCA, Proceedings of the Vision, Modeling, and Visualization Conference, Jan. 2003, pp. 271-279.
Muller et al., Neural Control Variates, ACM Transactions on Graphics, vol. 39, No. 6, Dec. 2020, pp. 243:1-243:19.
Muller et al., Neural Importance Sampling, ACM Transactions on Graphics, vol. 38, No. 5, Oct. 2019, pp. 145:1-145:19.
Nalbach et al., Deep Shading: Convolutional Neural Networks for Screen-Space Shading, Eurographics Symposium on Rendering, vol. 36, No. 4, Jul. 2017, 14 pages.
Olano et al., Lean Mapping, In Proceedings of the 2010 ACM SIGGRAPH symposium on Interactive 3D Graphics and Games, Feb. 19-21, 2010, pp. 181-188.
Oliveira et al., An Efficient Representation for Surface Details, UFRGS Technical Report, Jan. 26, 2005, 9 pages.
Oliveira, Relief Texture Mapping, In Proceedings of the 27th Annual Conference on Computer Graphics and Interactive Techniques, 2000, 10 pages.
Pharr et al., PBRT V3, Available Online at: https://github.com/mmp/pbrt-v3/, Accessed from Internet on Dec. 1, 2021, pp. 1-4.
Policarpo et al., Real-Time Relief Mapping on Arbitrary Polygonal Surfaces, Proceedings of the 2005 Symposium on Interactive 3D Graphics and Games, Apr. 2005, pp. 155-162.
Porumbescu et al., Shell Maps, ACM Transactions on Graphics, vol. 24, No. 3, Jul. 2005, 8 pages.
Rainer et al., Neural BTF Compression and Interpolation, Computer Graphics Forum, vol. 38, No. 2, May 2019, 10 pages.
Rainer et al., Unified Neural Encoding of BTFs, Computer Graphics Forum (Proceedings of Eurographics), vol. 39, No. 2, May 2020, pp. 167-178.
Rematas et al., Deep Reflectance Maps, Proceedings of the IEEE Conference on Computer Vision and Pattern Recognition, Jun. 27-30, 2016, pp. 4508-4516.
Szirmay-Kalos et al., Displacement Mapping on the GPU—State of the Art, Computer Graphics Forum, vol. 25, No. 3, 2006, pp. 1-24.
Thies et al., Deferred Neural Rendering: Image Synthesis Using Neural Textures, ACM Transactions on Graphics, vol. 38, No. 4, Apr. 28, 2019, 12 pages.
Thonat et al., Tessellation-Free Displacement Mapping for Ray Tracing, ACM Transactions on Graphics, vol. 40, No. 6, Article 282, Dec. 14, 2021, 2 pages.
Wang et al., Capturing and Rendering Geometry Details for BTF-Mapped Surfaces, The Visual Computer, vol. 21, No. 8, Sep. 2005, pp. 1-9.
Wang et al., Generalized Displacement Maps, The Eurographics Association, 2004, 8 pages.
Wang et al., View-Dependent Displacement Mapping, ACM Transactions on Graphics (TOG), vol. 22, No. 2, 2003, pp. 334-339.
Weinmann et al., Material Classification Based on Training Data Synthesized Using a BTF Database, European Conference on Computer Vision, vol. 8691, Sep. 2014, pp. 156-171.
Williams, Pyramidal Parametrics, Siggraph, ACM, vol. 17, No. 3, Jul. 1983, pp. 1-11.
Wu et al., Accurate Appearance Preserving Prefiltering for Rendering Displacement-Mapped Surfaces, ACM Transactions on Graphics, vol. 38, No. 4, Jul. 2019, pp. 137:1-137:14.
Yan et al., A Bssrdf Model for Efficient Rendering of Fur with Global Illumination, ACM Transactions on Graphics, vol. 36, No. 6, Nov. 2017, pp. 208:1-208:13.

(56) References Cited

OTHER PUBLICATIONS

Zhao et al., Downsampling Scattering Parameters for Rendering Anisotropic Media, ACM Transactions on Graphics, vol. 35, No. 6, Nov. 2016, pp. 166:1-166:11.
U.S. Appl. No. 17/538,311, "Notice of Allowance", Jul. 7, 2023, 18 pages.
Zhao et al., "Building Volumetric Appearance Models of Fabric Using Micro CT Imaging", ACM Transactions on Graphics, vol. 30, Issue 4, Article No. 44, 2014, pp. 1-4.

* cited by examiner

Example tangent curvature 401

Example filtering 402 along a line

700

Basket weave 901 material

Perforated leather 902 material

Direct alpha prediction 1001

1011  1012

Silhouette cosine prediction 1005

1021  1022

NEURAL NETWORKS TO RENDER TEXTURED MATERIALS ON CURVED SURFACES

TECHNICAL FIELD

This disclosure generally relates to graphically rendering textured surfaces and, more particularly, to techniques for using neural networks to graphically render textured surfaces.

Background

The world is full of materials with interesting small-scale structure: a green pasture with millions of individual blades of grass, a scratched and partially rusted metallic paint on a car, a knitted sweater, or a velvet dress. Realism in rendering underlying intermediate structures and microstructures of complex materials such as these can vary greatly based on various factors, such as complex surface height profiles, fibers and yarns, self-shadowing, reflections and refractions, and subsurface scattering. The level of realism can also vary according to levels of detail. For instance, individual fibers of a fabric might be visible at high magnification but become unnoticeable at reduced magnification.

SUMMARY

The present disclosure describes techniques for rendering textured surfaces using an SBTF model. A scene modeling system accesses a three-dimensional (3D) scene including a 3D object. The scene modeling system applies a silhouette bidirectional texture function (SBTF) model to the 3D object to generate an output image of a textured material rendered as a surface of the 3D object. Applying the SBTF model includes determining a bounding geometry for the surface of the 3D object. Applying the SBTF model includes determining, for each pixel of the output image, a pixel value based on the bounding geometry. The scene modeling system displays, via a user interface, the output image based on the determined pixel values.

Various embodiments are described herein, including methods, systems, non-transitory computer-readable storage media storing programs, code, or instructions executable by one or more processing devices, and the like. These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
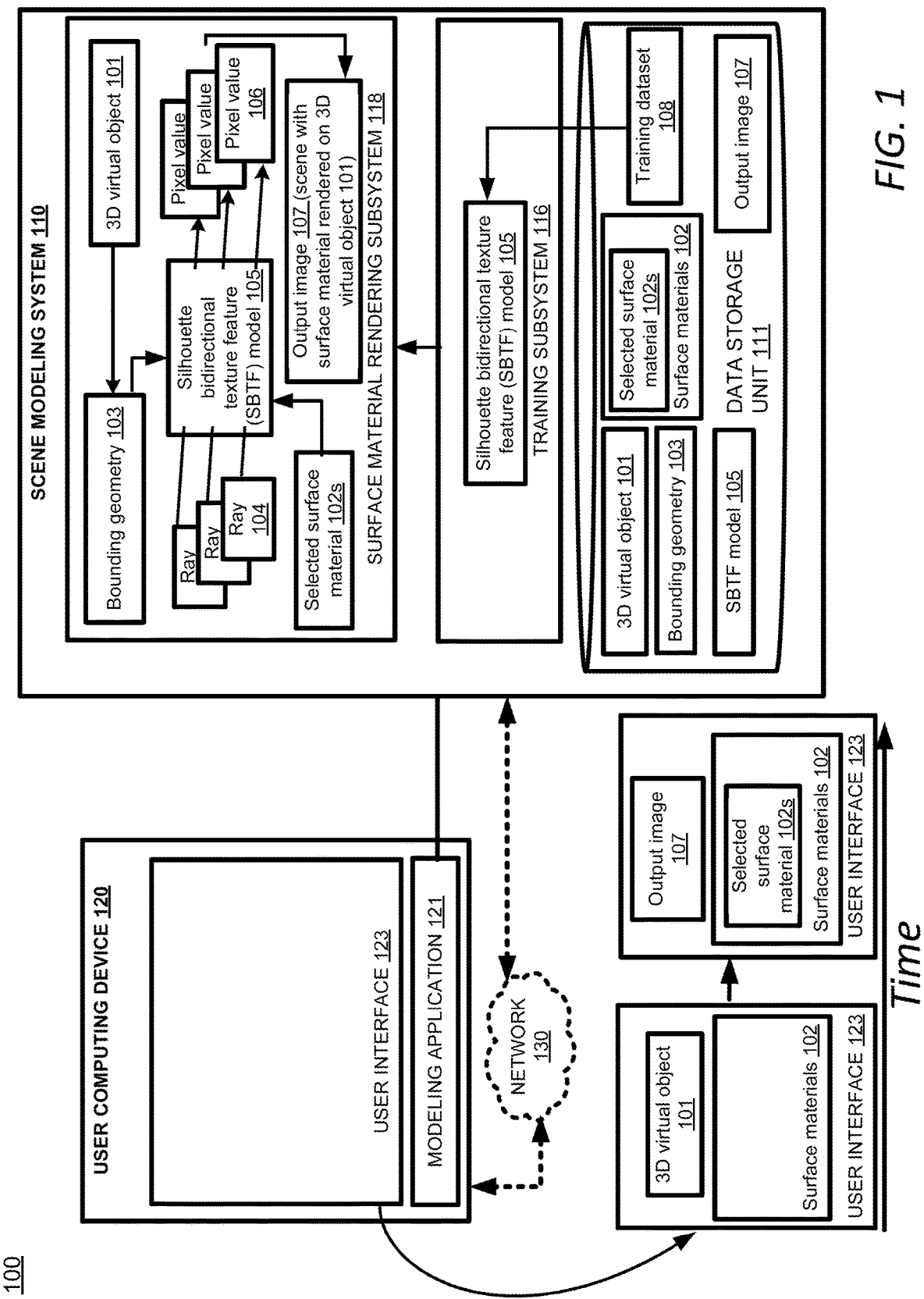
FIG. 1 depicts an example of a computing environment for rendering a textured material surface to a 3D virtual object using a silhouette bidirectional texture function (SBTF) model, according to certain embodiments disclosed herein.

In the following description, for the purposes of explanation, specific details are set forth in order to provide a thorough understanding of certain embodiments. However, it will be apparent that various embodiments may be practiced without these specific details. The figures and description are not intended to be restrictive. The words "exemplary" or "example" are used herein to mean "serving as an example, instance, or illustration." Any embodiment or design described herein as "exemplary", or "example" is not necessarily to be construed as preferred or advantageous over other embodiments or designs.

In a conventional ray-tracing rendering technique, a system would determine the color for each pixel of an image or frame by casting a hypothetical ray from a camera origin through the screen coordinates of the pixel toward a set of objects making up a scene. If the ray hits an object, then the color of the pixel is determined based on properties of the object as the object appears under whatever light sources are in the scene. If the ray misses all objects in the scene, however, then no part of an object is displayed at the corresponding pixel. In these conventional rendering techniques, the surface appearance of an object can be defined by a bidirectional texture function (BTF), which allows for a complex definition to be used to define a textured surface.

BTFs can facilitate realistic images of objects with complex surface textures. Bidirectional texture functions (BTFs) capture the textural appearance of complex materials, both physical and simulated.

However, conventional BTFs require considerable time to render, thus making textures that utilize BTFs impractical for applications that require fast render times, such as gaming, virtual reality, or augmented reality applications. Many methods have been used to compress BTFs, including several neural approaches, but none of the existing BTF compression and representation methods have the ability to handle grazing, where a ray passes close by (within a distance to) a surface material but is affected by the surface material, resulting in artifacts and other distortions near edges of surface materials. Accordingly, these existing methods do not present a realistic view of the edges of objects with complex textures.

Some embodiments described herein overcome this problem with the conventional BTF-related techniques. According to embodiments described herein, an SBTF model is presented which includes surface is defined by a BTF, but additionally, a bounding geometry defined for the surface material. The bounding geometry of the SBTF may have a simple definition (compared to the surface defined by a BTF) that enables fast determination of whether a ray hits the bounding geometry. In some embodiments, defining a bounding geometry includes using a coarse (e.g. low polygon count) triangle mesh. Intersecting a ray with such a mesh includes using a ray-triangle intersection algorithm. During a ray-tracing aspect of rendering, if a query ray hits the bounding geometry, the scene rendering system performs further computations based on the BTF to determine whether the query ray truly hits the actual surface of the object. However, if the query ray misses the bounding geometry, the scene rendering system can assume that the query ray misses the surface as well. Using the bounding geometry in the SBTF model described herein can therefore reduce a bandwidth usage compared to a bandwidth usage required by a conventional BTF. Further, the scene rendering system described herein trains a neural network to learn how to render a given surface using this concept of bounding geometries. The neural network is trained on the curvatures of various size cylinders and, as a result, is able to quickly render various materials.

In an example, a scene modeling system accesses a three-dimensional (3D) scene including a 3D object. Examples of a 3D object include a vehicle, a house, an animal, an object, or other item. In some instances, the 3D object includes a curved surface. For example, the 3D scene includes a bucket 3D object. In some instances, the user can view, via a user interface, the 3D object from multiple camera positions defined by a camera location and a viewing angle of the camera within the 3D scene. The scene modeling system, in some instances, accesses the 3D scene including the 3D object from a data storage unit responsive to receiving an input from a user of a modeling application. The scene modeling system can display the 3D scene via the user interface.

The scene modeling system receives a request to edit the 3D object by applying a material to a surface of the 3D object. For example, the scene modeling system displays the scene including the bucket 3D object via the user interface and displays a menu of materials from which the user can select. For example, the menu of materials includes a set of materials including brick, stone, wood, ceramic tile, laminate, plastic, or other material and one or more styles of these materials. For example, the user could select from brick style 1 (standard brick pattern), brick style 2 (herringbone pattern), and other brick styles within the brick material options. For example, the user selects the brick style 1 and requests to view the bucket having the brick style 1 pattern material as its surface.

The scene modeling system applies a silhouette bidirectional texture function (SBTF) model to the to the 3D object to generate an output image of an edited scene associated with a camera position. The edited scene includes an edited 3D object having the selected material applied to the surface of the 3D object. For example, the edited 3D object is the bucket 3D object having a surface including the selected brick style 1 material. Applying the SBTF model to the 3D object includes determining a bounding geometry corresponding to the 3D object and determining a value for each pixel of the output image based on the bounding geometry. For example, in a pixel-wise analysis for the output image, the SBTF model determines whether a ray projected into the scene through each pixel of the output image collides with the bounding geometry or not. If the ray projected through a pixel encounters the bounding geometry, the SBTF model determines an opacity value for the pixel and an offset vector and, based on the offset vector, determines a reflectance value for the pixel. The offset facilitates the rendering of the pixel to consider various factors such as shadows created when light is reflected on a particular angle of an uneven surface. The light reflectance value is a metric that identifies an amount of visible and usable light that reflects from a part of the textured surface that is represented by a pixel. For example, the light-reflectance value is a metric that identifies a percentage of light a color of the pixel reflects. The light-reflectance value can be represented by RGB color values. If the ray for the pixel does not encounter the bounding geometry, the SBTF model determines that the surface of the 3D object is not represented in the pixel.

The scene modeling system displays the output image of scene based on the opacity, offset, and/or light reflectance values determined for each pixel. The scene modeling system can determine a light reflectance value for a pixel of the textured surface at a location of the pixel if the scene modeling system determines a non-zero opacity value for the pixel. Such process can be repeated for other pixels of the textured surface to render the detailed and complex patterns of the 3D object. In some instances, when the opacity value is determined to be zero (when a projected ray does not encounter the bounding geometry), the scene modeling system determines that the pixel corresponds to a background of the scene and does not correspond to the 3D object and the scene modeling system assigns a background color value to the pixel.

Certain embodiments described herein provide improved techniques for using neural networks to accurately render complex, textured surfaces defined by BTFs. Some embodiments of a rendering system described herein incorporate the concept of associating a bounding geometry with a surface defined by a BTF. Further, embodiments effectively train a neural network to perform renders of the surface based on learning how to render the material on cylinders of multiple sizes. The combination of the bounding geometry and the neural network retains the accuracy of using BTFs while providing efficient and accurate renders, even at silhouette boundaries.

Example Operating Environment for Rendering a Textured Material Surface to a 3D Virtual Object Using a Silhouette Bidirectional Texture Function (SBTF) Model Referring now to the drawings, FIG. 1 depicts an example of a computing environment 100 rendering a textured material surface to a 3D virtual object using an SBTF model 105. The computing environment 100 includes a user computing device 120 and a scene modeling system 110, which can include one or more processing devices that execute a surface material rendering subsystem 118 and a training subsystem 116. In certain embodiments, the scene modeling system 110 operates on the user computing device 120. In some instances, the modeling application 121 performs the functions of the scene modeling system 110. In other embodiments, however, the scene modeling system 110 is accessible to the user computing device via a network 130 and is a separate computing system from the user computing device 120. In certain embodiments, each of the surface material rendering subsystem 118 and the training subsystem 116 is a network server or other computing device connected to a network 130. The surface material rendering subsystem 118 accesses or otherwise receives a 3D virtual object 101. For example, the surface material rendering subsystem 118 accesses the 3D virtual object 101 from a data storage unit 111 of the scene modeling system 110 or otherwise accessible to the scene modeling system 110. In certain examples, the 3D virtual object 101 is represented in a 3D virtual scene. In certain examples, the 3D virtual object 101 is generated by a user using the modeling application 121. The 3D virtual object 101 has a surface. In some instances, the surface is a curved or other uneven surface. The surface material rendering subsystem 118, in some instances, displays a list of materials 102 to render on the surface of the 3D virtual object 101 and receives a selection of a selected surface material 102s. In some instances, the list of materials 102 is displayed via a user interface 123 of the user computing device 120 and the surface material rendering subsystem 118 receives the selection of the selected surface material 102s via the user interface 123. The selected surface material 102s can define a material (e.g., ceramic, brick, wood, plastic, etc.) and a texture (e.g. a brick texture, a wicker texture, a wood grain texture, etc.) for the material to render as the surface of the 3D virtual object 101. For example, the user can select one or more user interface 123 objects to select the selected surface material 102s from a list of materials 102.

The surface material rendering subsystem 118 determines a bounding geometry 103 (e.g., a bounding object) for the 3D virtual object 101. The surface material rendering subsystem 118 determines the bounding geometry 103 to define, using a simple curved geometry, limits of the curved surface of the 3D virtual object 101. The bounding geometry 103 is used by the SBTF model 105 to determine whether a ray 104 projected through a pixel of an output image is deemed to have encountered the surface of the 3D virtual object 101. The surface material rendering subsystem 118 applies a trained silhouette bidirectional texture function (SBTF) model 105 to the 3D virtual object 101 to render the selected surface material 102s on the surface of the 3D virtual object 101. Applying the trained SBTF model 105 involves projecting, for each pixel of an output image of the scene representing the 3D virtual object 101 with the selected surface material 102s rendered on its surface, a ray 104 through the scene and determining a pixel value 106 for the pixel. In some instances, if the projected ray 104 encounters the bounding geometry 103, the SBTF model 105 returns a pixel value 106 including a nonzero opacity (alpha) value that indicates that the ray 104 encountered the bounding geometry 103 in addition to an offset vector and a reflectance value for the pixel. The reflectance value, in some instances, in an RBG color value for the pixel. In some instances, the projected ray 104 does not encounter the bounding geometry, the SBTF model 105 returns a pixel value 106 that includes an opacity value of zero and does not determine an offset vector and a reflectance value for the pixel. The output image 107 with the defined pixel values 106 represents an edited 3D virtual object 101 that includes the selected surface material 102s rendered as the surface material of the 3D virtual object 101 An example method for rendering the selected surface material 102s on the 3D virtual object 101 is described herein in FIG. 2. Further details describing an SBTF model 105 are described herein in FIG. 3. An example of a bounding geometry 103 determined for a 3D virtual object 101 is shown in FIG. 4.

The surface material rendering subsystem 118 can display the output image 107 on the user interface 123 of the user computing device 120. In some embodiments, the surface material rendering subsystem 118 generates multiple output images 107 representing the 3D virtual object 101 with the rendered selected surface material 102s as its surface, where each of the multiple output images 107 is associated with a respective camera position and viewing angle. In some instances, the user can change the camera position and angle to view the 3D virtual object 101 with the rendered selected surface material 102s from multiple camera positions and viewing angles within a scene.

In some embodiments, the scene modeling system 110 trains the SBTF model 105 using a training subsystem 116. Training the SBTF model 105 involves training a neural surface material representation on a training dataset 108 that includes queries spanning a variety of surface curvatures. In some instances, the training subsystem 116 trains the SBTF model 105 on cylindrical surface patches of different radii where different rotations and translations are applied to the surface patches. An example method for training the SBTF model 105 is described herein in FIG. 5.

The scene modeling system 110 includes a data storage unit 111. An example data storage unit 111 is accessible to the scene modeling system 110 and stores data for the scene modeling system 110. In some instances, the data storage unit 111 stores the 3D virtual object 101, the bounding geometry 103 generated for the 3D virtual object 101, the trained SBTF model 105, a set of renderable surface materials 102 including the selected surface material 102s, one or more output images 107 depicting the 3D virtual object 101 including the rendered selected surface material 102s, and a training dataset 108.

An example user computing device 120 includes a modeling application 121 and a user interface 123. In certain embodiments, as depicted in FIG. 1, the user computing device 120 comprises the scene modeling system 110. In some embodiments, the user computing device 120 is a separate computing system from the scene modeling system 110 and communicates with the scene modeling system 110 via the network 130. In certain embodiments, the user computing device 120 is a smart phone device, a personal computer (PC), a tablet device, or other user computing device 120. The modeling application 121, in some embodiments, is associated with the scene modeling system 110 and the user downloads the modeling application 121 on the user computing device 120. For example, the user accesses an application store or a website of the scene modeling system 110 using the user computing device 120 and requests to download the modeling application 121 on the user computing device 120. The modeling application 121 operates on the user computing device 120 and enables a user of the user computing device 120 to retrieve a 3D virtual object 101, view a list of surface materials 102, and select a selected surface material 102s from the list of surface materials 102. The modeling application 121 enables the user to interact, via the user interface 123 with the scene modeling system 110. The modeling application 121 can communicate with the user interface 123 to receive one or more inputs from the user. The modeling application 121 can instruct the user interface 123 to display the 3D virtual object 101, display the list of surface materials 102, receive a selection of a selected surface material 102s from the list of surface materials, and display an output image 107 representing the selected surface material 102s rendered on a surface of the 3D virtual object 101. In some embodiments, the modeling application 121 communicates with one or more of the surface materials rendering subsystem 118, the training subsystem 116, or the data storage unit 111 of the scene modeling system 110. In certain embodiments, the modeling application 121 includes the surface material rendering subsystem 118 and the training subsystem 116 and performs the operations described herein as being performed by the subsystems 118 and 116. For example, in certain embodiments, the modeling application 121 of the user computing device 120 can apply the SBTF model 105 to the 3D virtual object 101 to generate an output image 107 depicting the 3D virtual object 101 having the selected surface material 102s.

The user interface 123 can include a touchscreen display interface, a display device (e.g., a monitor) with a separate input device (e.g. a mouse), or other user interface 123 which can receive one or more inputs from the user and display information or provide other output to the user. For example, the user interface 123 can display the 3D virtual object 101, a list of surface materials 102, and the selected surface material 102s selected by the user for rendering on the surface of the 3D virtual object 101. In some instances, the user interface 123 displays the output image 107 depicting the 3D virtual object 101 having the rendered selected surface material 102s. The user interface 123 receives one or more inputs from the user, in some instances, to select the selected surface material 102s from a list of surface materials 102. The user interface 123 receives one or more inputs from the user, in some instances, to modify a camera position and/or camera angle and can display one or more output images 107 generated by the surface material rendering subsystem 118 corresponding to various camera positions and viewing angles.

As depicted in FIG. 1, the scene modeling system 110 can display, via the user interface 123, the 3D virtual object 101 as well as a list of surface materials 102 for selection by the user. As depicted in FIG. 1, responsive to a user selection of a selected surface material 102s from the list of surface materials 102, the scene modeling system 110 can display, via the user interface 123, the selected surface material 102s as well as an output image 107 depicting the 3D virtual object 101 having a surface comprising the selected surface material 102s. In certain embodiments, the user can select, via the user interface 123, a subsequent surface material 102s from the list of surface materials 102 and the scene modeling system 110 can apply, while using the same determined bounding geometry 103, another SBTF model 105 associated with the subsequent surface material 102s to render the subsequently selected surface material 102s to the 3D virtual object 101 and generate, for display, a subsequent output image 107 depicting the 3D virtual object 101 with the subsequently selected surface material 102s. For example, for each of a set of surface materials 102s, the training subsystem 116 trains a respective SBTF model 105 to render the respective surface material 102s to 3D virtual objects 101. In this example, a bounding geometry 103 determined for a 3D virtual object 101 can be used by multiple SBTF models 105 to render multiple surface materials 102s to a surface of the 3D virtual object 101.

In some embodiments, as depicted in FIG. 1, the user computing device 120 comprises the scene modeling system 110 and the scene modeling system 110, including the surface material rendering subsystem 118, the training subsystem 116, and the data storage unit 111, operate on the user computing device 120. In some instances, the modeling application 121 of the user computing device 120 performs the functions described herein as being performed by the scene modeling system 110 and the components and/or subsystems thereof.

However, in other embodiments, as also depicted in FIG. 1, the scene modeling system 110 is a separate computing system from the user computing device 120 and is accessible to the user computing device 120 via a network 130. For example, in these other embodiments, the modeling application 121 communicates with the scene modeling system 110 via the network 130. In these other embodiments, the user computing device 120 displays, via the user interface 123, the initial 3D virtual object 101 as well as the output image 107 generated by the scene modeling system 110 using the SBTF model 105.

The scene modeling system 110, including the surface material rendering subsystem 118, and the training subsystem 116, may be implemented using software (e.g., code, instructions, program) executed by one or more processing devices (e.g., processors, cores), hardware, or combinations thereof. The software may be stored on a non-transitory storage medium (e.g., on a memory component). The computing environment 100 depicted in FIG. 1 is merely an example and is not intended to unduly limit the scope of claimed embodiments. One of the ordinary skill in the art would recognize many possible variations, alternatives, and modifications. For example, in some implementations, the scene modeling system 110 can be implemented using more or fewer systems or subsystems than those shown in FIG. 1, may combine two or more subsystems, or may have a different configuration or arrangement of the systems or subsystems.

Figure 2:
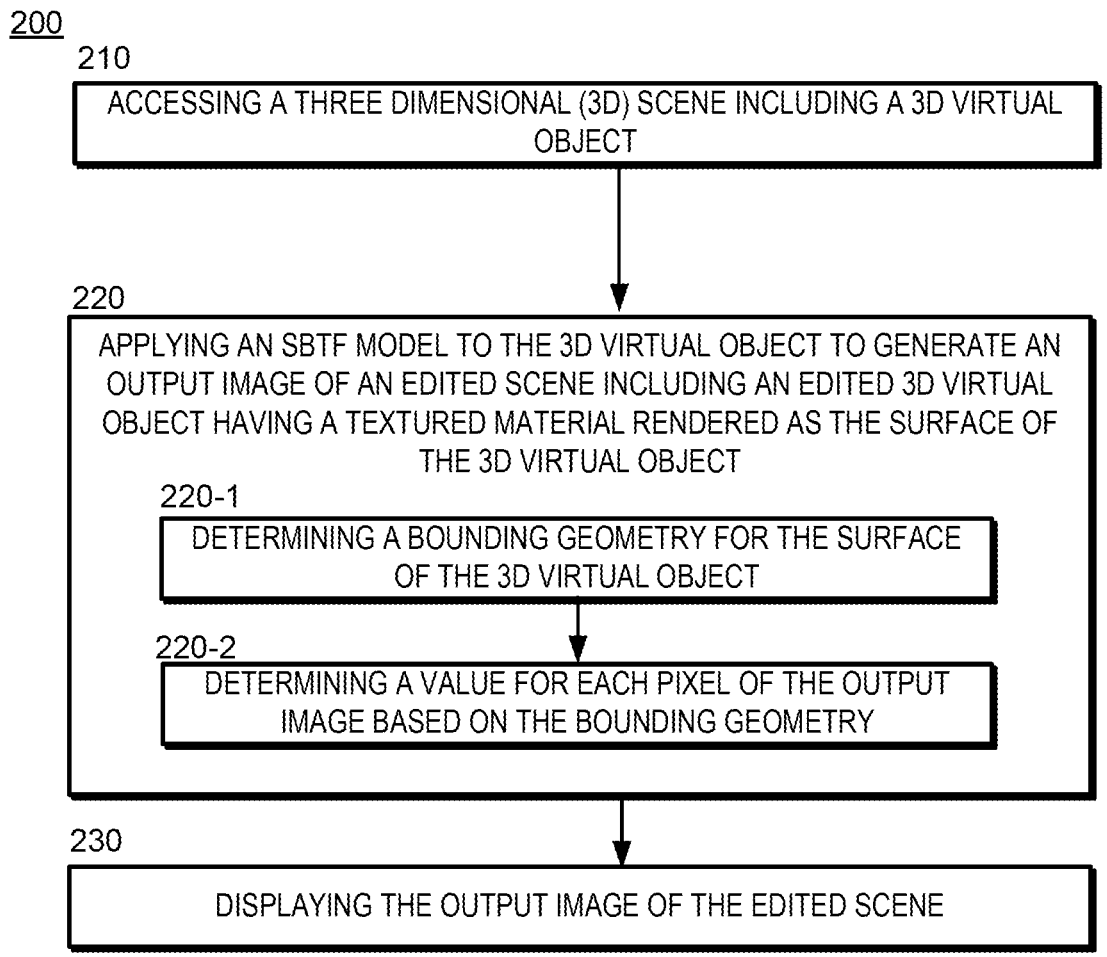
FIG. 2 depicts a method for rendering a textured material surface to a 3D virtual object using a silhouette bidirectional texture function (SBTF) model, according to certain embodiments disclosed herein.

Examples of Computer-Implemented Operations for Rendering a Textured Material Surface to a 3D Virtual Object Using a Silhouette Bidirectional Texture Feature (SBTF) Model FIG. 2 depicts an example of a method for rendering a textured material surface to a 3D virtual object 101 using an SBTF model 105, according to certain embodiments disclosed herein. One or more computing devices (e.g., the scene modeling system 110 or the individual subsystems contained therein) implement operations depicted in FIG. 2. For illustrative purposes, the method 200 is described with reference to certain examples depicted in the figures. Other implementations, however, are possible.

At block 210, the method 200 involves accessing, by a scene modeling system 110, a 3D scene including a 3D virtual object 101. The 3D virtual object 101 may be of a car, a building, an animal, or other item. In some instances, the 3D scene represents an environment such as a room or an outdoor space. The 3D virtual object 101 includes defined dimensions, contours, or other information which defines a surface of the 3D virtual object 101. In some instances, the scene modeling system accesses the 3D virtual scene including the 3D virtual object 101 responsive to receiving a user input. For example, a user accesses the modeling application 121 (or a web browser application) executing on the user computing device 120, selects one or more objects on the user interface 123 of the user computing device to request to access the 3D virtual object 101 or to generate a new 3D virtual object 101. The scene modeling system 110 receives the inputs of the user and accesses the 3D virtual object 101 responsive to receiving the user selection, and the scene modeling system 110 provides the 3D virtual object 101 for display via the user interface 123 of the user computing device 120. In some instances, the user can position and/or reposition the 3D virtual object 101 within the virtual 3D scene using the user interface 123.

At block 220, the method 200 involves applying, by the scene modeling system 110, an SBTF model 105 to the 3D virtual object 101 to generate an output image 107 of an edited scene, the edited scene including an edited 3D virtual object 101 including a textured material rendered as the surface of the 3D virtual object 101.

In certain embodiments, implementing block 220 includes implementing sub-blocks 220-1 and 220-2.

At sub-block 220-1, implementing 220 involves determining a bounding geometry 103 for the 3D object The surface material rendering subsystem 118 determines the bounding geometry 103 to define, using a simple curved geometry, limits of the curved surface of the 3D virtual object 101. The bounding geometry 103 is used by the SBTF model 105 to determine whether a ray 104 projected through a pixel of an output image is deemed to have encountered the surface of the 3D virtual object 101.

At sub-block 220-2, implementing block 220 involves determining a pixel value for each pixel of the output image based on the bounding geometry 103 determined in sub-block 220-1. For example, in a pixel-wise analysis for the output image, the SBTF model determines whether a ray projected into the scene through each pixel of the output image collides with the bounding geometry or not. If the ray projected through a pixel encounters the bounding geometry, the SBTF model determines an opacity value for the pixel and an offset vector and, based on the offset vector, determines a reflectance value for the pixel. The offset facilitates the rendering of the pixel to consider various factors such as shadows created when light is reflected on a particular angle of an uneven surface. The offset moves (offsets) the UV location encountered on the coarse mesh bounding geometry 103 to a corrected UV location on the detailed material 102 surface. Determining the offset simulates a parallax effect of fine geometry even though only the coarse geometry is explicitly represented. The light reflectance value is a metric that identifies an amount of visible and usable light that reflects from a part of the textured surface that is represented by a pixel. For example, the light-reflectance value is a metric that identifies a percentage of light a color of the pixel reflects. The light-reflectance value can be represented by RGB color values. If the ray for the pixel does not encounter the bounding geometry, the SBTF model determines that the surface of the 3D object is not represented in the pixel.

In the SBTF model 105 described herein, the selected material 102s is applied to a bounding geometry 103, where the represented material is fully contained under the bounding geometry 103. Therefore, rays 104 that miss the bounding geometry 103 will also miss the selected material 102s. However, rays that encounter the bounding geometry 103 may or may not encounter the selected material 102s. For example, a "grazing" ray 104 passes through the bounding geometry 103 but does not collide with the selected material 102s, which causes a complex silhouette effect. The SBTF model 105 outputs an opacity value of between zero (0) and one (1), $\alpha \in [0,1]$. If the opacity value is one (1), the ray 104 hit the selected material 102s and should reflect off the selected material 102s. If the opacity value is zero (0), the selected material 102s is missed by the ray. Opacity (alpha) values between zero and one can also occur in some instances. For an alpha value between zero and one, the SBTF model 105, in some instances, stochastically (e.g. by flipping a random number) determines that the ray collides with the surface fifty percent of the time and does not collide with the surface fifty percent of the time.

The SBTF model 105, $S(\mu, \omega_i, \omega_o, k)$, comprises two components, a reflectance component, and a transparency component:

$$S(\mu,\omega_i,\omega_o,k)=(\rho(\mu,\omega_i,\omega_o,k),a(u,o_o,k)) \quad (1)$$

Where the reflectance value $\rho$ is an outgoing radiance in direction $\omega_o$ when lit by unit directional light from a direction $\omega_i$, where k is a local curvature along a projected ray 104 direction to the SBTF model 105 and u represents texture coordinates. Texture coordinate units, in some instances, match real world units, and, in other instances, are precomputed at a specific scale. In certain embodiments, the SBTF model 105 can predict a non-zero opacity value for light directions $\omega_i$ that are facing away from the bounding geometry 103 intersection point's normal, even for opaque surfaces, which cannot happen on an infinite plane that always blocks light directions below the horizon. This non-zero opacity value prediction is a consequence of considering curved surfaces in the SBTF model 105. In other words, a reflected radiance L at point u in direction wo can be represented as a spherical integral of incoming radiance weighted by the SBTF model 105, as follows:

$$L(\mu\to\omega_o)=\alpha(\mu,\omega_o,k)\int_{s_2}(\mu,\omega_i,\omega_o,k)L(\mu\leftarrow\omega_i)d\omega_i \quad (2)$$

Figure 3:
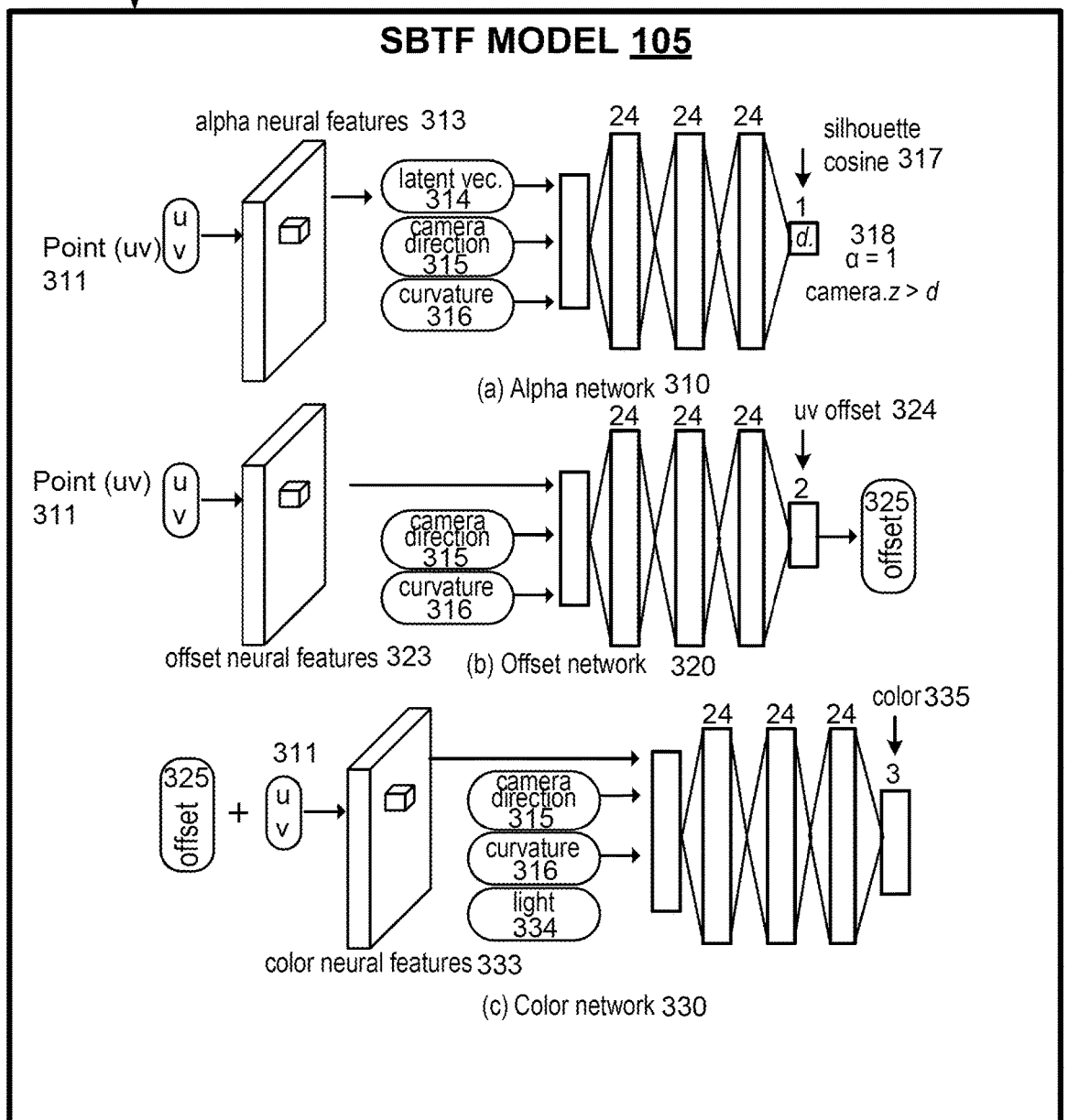
FIG. 3 depicts an SBTF model for use in the method of FIG. 2 and in the computing environment of FIG. 1, according to certain embodiments disclosed herein.
Figure 4A:
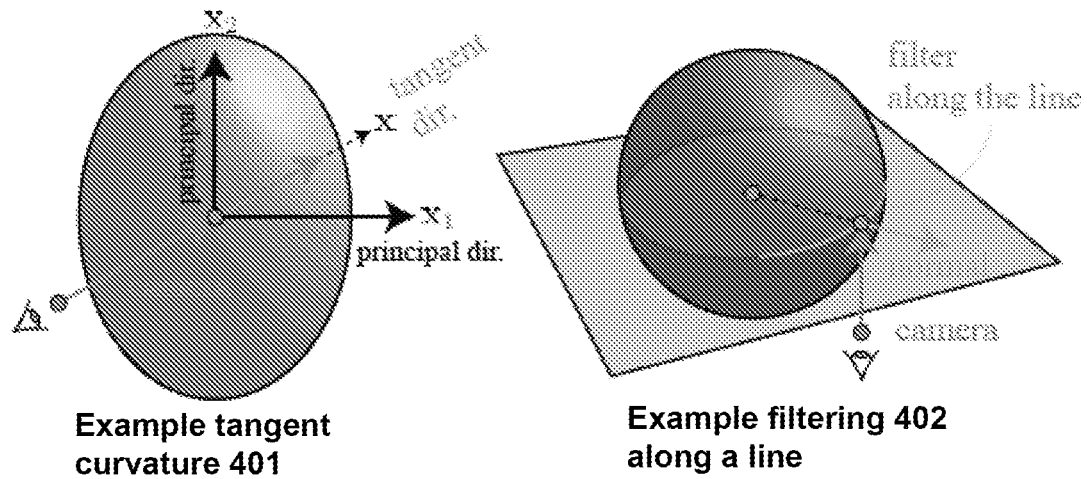
FIG. 4*a* illustrates an example tangent curvature showing a relationship between two principal directions and a tangent direction, which can be used for determining a curvature value, and an example filtering along a line to determine a curvature value of a silhouette region, which can be used for determining a curvature value for use in the SBTF model of FIG. 3.
Figure 4B:
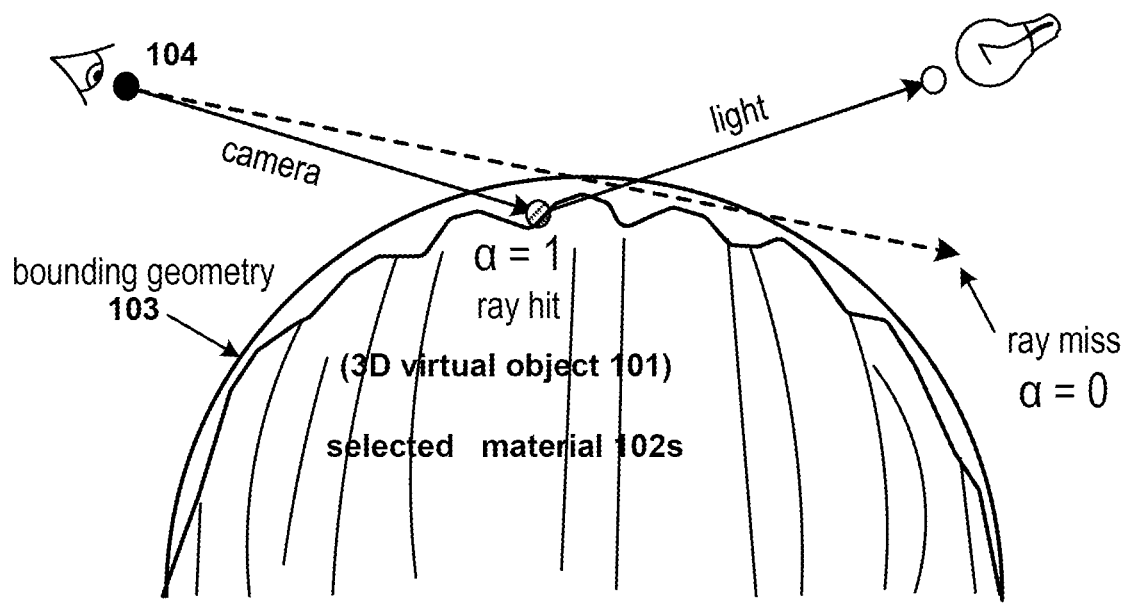
FIG. 4*b* illustrates an example bounding geometry that can be used in the SBTF model of FIG. 3 and in the method of FIG. 2, according to certain embodiments disclosed herein.

Further details about the SBTF model 105 are described in FIG. 3. An example of a bounding geometry 103 is depicted in FIG. 4b.

At block 230, the method 200 involves displaying by the scene modeling system 110, the output image 107 of the edited scene. The scene modeling system 110 displays the output image of scene based on the pixel values 106 (e.g., opacity value, offset vector, and/or light reflectance value) determined for each pixel of the output image 107. The scene modeling system 110 can determine a light reflectance value for a pixel of the textured surface at a location of the pixel if the scene modeling system determines a non-zero opacity value for the pixel. Such process can be repeated for other pixels of the textured surface to render the detailed and complex patterns of the selected textured surface material 102s of the 3D virtual object 101. In some instances, when the opacity value is determined to be zero (when a projected ray 104 does not encounter the bounding geometry 103), the scene modeling system 110 determines that the pixel corresponds to a background of the scene and does not correspond to the 3D virtual object 101 and the scene modeling system 110 assigns a background color value to the pixel.

FIG. 3 depicts an illustration 300 of an SBTF model 105 for use in the method of FIG. 2 and in the computing environment of FIG. 1, according to certain embodiments disclosed herein. Other implementations, however, are possible. The example SBTF model 105 comprises an alpha network 310, an offset network 320, and a color network 330. The SBTF model 105 computes, for each pixel of an output image 107, a pixel value 106 including one or more of an opacity (alpha) 318 value predicted by the alpha network 310, a neural offset 325 vector predicted by the offset network 320, and a color 335 (light reflectance) value predicted by the color network 330. The pixel value 106 includes an opacity 318 value of zero if a ray 104 projected through the pixel of the output image 107 does not encounter the bounding geometry 103 and a non-zero opacity 318 value if the ray 104 encounters the bounding geometry 103. When the opacity 318 value determined by the alpha network 310 is zero, the SBTF model 105 does not compute a neural offset 325 vector or a color (reflectance) value 335 for the pixel. When the opacity 318 determined by the alpha network is greater than zero, however, the offset network 320 determines a neural offset 325 vector and the color network 330 determines a color 335 value for the pixel. Because the neural offset 325 vector and color 335 calculations do not depend on light direction, their evaluation can be reused for multiple light direction queries, for example, in a multiple importance sampling (MIS).

The alpha network 310 determines an opacity (alpha) 318 value for a pixel of the output image 107 based on a point 311 in UV-space of the ray 104 projected through the pixel. The alpha network 310 includes a neural feature texture (alpha neural features 313) and a fully connected network. The alpha neural features 313 include a 2-dimensional grid of feature vectors that can be bilinearly interpolated. The fully connected network may comprise a multi-layer perceptron (MLP) that uses a rectified linear unit (ReLU) activation function except for the last layer. In some embodiments, as depicted in FIG. 3, the alpha network 310 includes three hidden layers with 24 channels each. Based on the point 311 and the alpha neural features 313, the alpha network 310 determines a latent vector 314 comprising a value sotred in a two dimensional (2D) grid of neural features (e.g. alpha/opacity features, offset features, or color neural features). For a given UV location, the latent vector 314 is obtained from the 2D grid. Obtaining the latent vector 314 can include performing a bilinear interpolation because UV is a floating point value and not an integer. The latent vector 314, a camera direction 315, and curvature 316 value are input to the fully connected network, which predicts the opacity 318 value for the pixel. An alpha value of zero predicted by the alpha network 310 indicates that the ray 104 misses the bounding geometry 103 and continues to a next surface. An alpha value of greater than zero indicates that the ray 104 encounters the bounding geometry 103.

The alpha network 310 can determine the curvature 316 value that is input to the fully connected network. A curvature of a two dimensional (2D) surface at point p, in a direction x that lies within a tangent plane (orthogonal to a surface normal n) is a reciprocal of a radius of an osculating circle, which is a circle that locally aligns with the surface at the point p within the plane given by direction x and the surface normal n. A positive curvature 316 value represents a convex surface and a negative curvature 316 value represents a concave surface. The curvature at point p can be fully represented by two principal directions, $x_1$ and $x_2$, and associated principal curvatures $k_1$ and $k_2$, along the two principal directions. The curvature k(x) for any direction in the tangent plane can therefore be computed as:

$$k(x)=k_1(x_1 \cdot x)^2+k_2(x_2 \cdot x)^2 \quad (3)$$

where the principal directions $x_1$ and $x_2$ are orthogonal (i.e., $x_1 \cdot x_2=0$), unless $k_1=k_2$, in which case the principal directions $x_1$ and $x_2$ can still be chosen as orthogonal. The principal curvatures are the bounds of the range of curvatures over all other tangent directions x. FIG. 4a illustrates a relationship between two principal directions and a tangent direction, which can be used for determining a curvature.

To compute the curvature 316 value along the ray 104, the alpha network 310 can precompute principal directions and curvatures for every vertex (e.g. vertex on the bounding geometry 103 that is represented by a triangle mesh) using a computational geometry library (e.g., an interactive geometry lab (IGL) library) and, for a given vertex p and camera ray direction 315 ($\omega_0$), the alpha network 310 can project the ray into a corresponding tangent $x(\omega_0)$ and compute the curvature 316 value, $k(x(\omega_0))$, using Equation (3) and $$k=k(x(\omega_0))=k(\text{normalize}(\omega_0-n(\omega_0 \cdot n))) \quad (4)$$

The curvature 316 value (k), as illustrated in FIG. 3, is provided as an additional input to the fully connected network. For a general point p on any triangle (not necessarily a vertex), the computation of the curvature value can be interpolated from the triangle's vertices.

In some embodiments, instead of only using the value of curvature 316 at the shading point along the ray 104, the alpha network 310 filters the curvature 316 value by taking a minimum curvature along a short curve on the bounding geometry 103 past the shading point, in a plane defined by the incoming ray 104 and normal. In these embodiments, the curvature of an entire silhouette region is considered instead of just the curvature at the shading point. In certain embodiments, the curvature values are scaled. FIG. 4a illustrates determining the curvature of the entire silhouette region using a filtering process.

In certain embodiments described herein, curvature 316 is not a single number per shading point corresponding to a ray 104, but is defined as two principal curvatures with corresponding principal directions. In some embodiments, a mean curvature of the two principal curvatures is used. In some embodiments, a single curvature along a tangent direction of camera rays is used and may yield a more accurate result than using a mean curvature.

In some embodiments, the alpha network 310 determines an intermediate silhouette cosine 317 value, which is used to determine the opacity (alpha) 318 value. For height fields and certain materials, the opacity is a step function (opaque then transparent) of an incoming ray 104 cosine (the dot product of ray 104 direction 312 and bounding geometry 103 normal). In these embodiments, the alpha network 310 predicts the silhouette cosine 317 value where the transition between opaque and transparent occurs and then, as indicated in FIG. 3, the opacity (alpha) 318 value is zero (0) if the ray 104 cosine is lower than the predicted silhouette cosine 317 value and the opacity (alpha) 318 value is one (1) if the ray 104 cosine is equal to or greater than the predicted silhouette cosine 317 value.

The offset network 320 determines a UV-offset 325 for a pixel of the output image 107 based on the point 311 in UV-space of the ray 104 projected through the pixel, the camera direction 315 and the curvature 316 value. The offset network 320 includes a neural feature texture (offset neural features 323) and a fully connected network. The offset neural features 323 include a 2-dimensional grid of feature vectors that can be bilinearly interpolated. The fully connected network may comprise a multi-layer perceptron (MLP) that uses a rectified linear unit (ReLU) activation function except for the last layer. In some embodiments, as depicted in FIG. 3, the offset network 320 includes three hidden layers with 24 channels each. The predicted UV offset 325 does not have to be on a straight line given by the ray 104 direction. Instead of predicting a single value and then calculating the UV offset 325, the offset network 320 can predict the UV offset 325 directly as a two-dimensional (2D) vector, as follows:

$$\mu_{new} = \mu + \text{Offset}(\mu, \omega_0) \quad (5)$$

The UV offset 325 value is used as an input to the color network 330.

The UV offset 325 is a 2D value computed from an evaluation of the offset network at a UV location on the bounding geometry 103. As previously discussed, the bounding geometry 103 encloses a detailed surface of the 3D object 101 that the SBTF model 105 is representing. While rendering, the ray 104 intersects the bounding geometry 103 at a location. The UV offset 325 is the 3D distance to the UV location on the actual surface of the 3D object (which is what the SBTF model 105 is representing). Therefore, the original UV location plus the UV offset 325 is used in the final color network 330 to determine a reflectance value.

The color network 330 determines a color 335 value (light reflectance value) for a pixel of the output image 107 based on the UV offset 325 determined by the offset network 320 and the point 311 of the ray 104 projected through the pixel, the camera direction 315, the curvature 316 value, and a light direction 334. The color network 320 includes a neural feature texture (color neural features 33) and a fully connected network. The color neural features 333 include a 2-dimensional grid of feature vectors that can be bilinearly interpolated. The fully connected network may comprise a multi-layer perceptron (MLP) that uses a rectified linear unit (ReLU) activation function except for the last layer. In some embodiments, as depicted in FIG. 3, the color network 320 includes three hidden layers with twenty-four channels each. The new UV location $\mu_{new}$ determined by the offset network 320 can be used to query a final feature texture and predict the color 335 value (reflectance value). The color 335 value, in some instances, is a reflectance RGB value for the pixel of the output image 107.

The full SBTF model 105 can be represented as:

$$S(\mu, \omega_i), \omega_0, k) = (\text{Color}(\mu_{new}, \omega_i, \omega_0, k), \text{Alpha}(\mu, \omega_0, k)) \quad (6)$$

where $\mu_{new}$ is given by Equation (5) and k by Equation (4). In certain embodiments, the SBTF model 105 determines a pixel value 106 for each pixel of the output image 107. For pixels having a non-zero opacity (alpha) 318 value, the pixel value 106 includes the opacity 318 value and a color 335 value. For pixels having a zero opacity 318 value, the pixel value 106 includes only the opacity value. In some instances, the pixels having a zero opacity 318 value include a color value determined for a surface of an object in the 3D scene that is different from the 3D virtual object 101 (e.g., a background surface, another 3D virtual object, etc.) that is encountered by the ray 104 after it misses the 3D virtual object 101 surface.

FIG. 4a illustrates an example tangent curvature 401 showing a relationship between two principal directions and a tangent direction, which can be used for determining a curvature 316 value, and an example filtering 402 along a line to determine a curvature 316 value of a silhouette region. As shown in FIG. 4a, the SBTF model 105 query takes as input the curvature along a projected viewing ray 104 (camera ray) direction. The SBTF model 105 can calculate a tangent direction based on two principal directions as shown in FIG. 2 and as described in Equation (3) discussed previously. For example, a curvature at a point can be fully represented by two principal directions, $x_1$ and $x_2$ which are orthogonal (i.e., $x_1 \cdot x_2 = 0$). The principal curvatures are the bounds of the range of curvatures over all other tangent directions x. As depicted in the right portion of FIG. 4a, in an example filtering 402 operation along a line, instead of only using the value of curvature 316 at the shading point along the ray 104, the alpha network 310 filters the curvature 316 value by taking a minimum curvature along a short curve on the bounding geometry 103 past the shading point, in a plane defined by the incoming ray 104 and normal. In these embodiments, the curvature of an entire silhouette region is considered instead of just the curvature at the shading point.

FIG. 4b illustrates an example bounding geometry that can be used in the SBTF model of FIG. 3 and in the method of FIG. 2, according to certain embodiments disclosed herein. The bounding geometry 103 is defined for the selected material 102s surface of the 3D virtual object 101. As depicted in FIG. 4b, the bounding geometry 103 has a simple curved definition, compared to the complex geometry of the actual 3D virtual object 101 surface, that enables fast determination of whether a ray 104 hits the bounding geometry 103. During a ray-tracing aspect of rendering, if a query ray 104 hits the bounding geometry, the scene rendering system performs further computations based on the BTF to determine whether the query ray truly hits the actual surface of the object. For example, as depicted in the dashed ray 104 of FIG. 4b ("ray miss, $\alpha=0$"), the dashed ray 104 encounters the bounding geometry 103 but does not actually touch the selected material 102s surface of the 3D virtual object 101, while the solid ray 104 ("ray hit, $\alpha=1$") touches the bounding geometry 103 and the selected material 102s surface and generates a light reflectance ray, for which the SBTF model 105 determines a color value. If the query ray misses the bounding geometry, the SBTF model 105 can assume that the query ray misses the surface as well.

Figure 5:
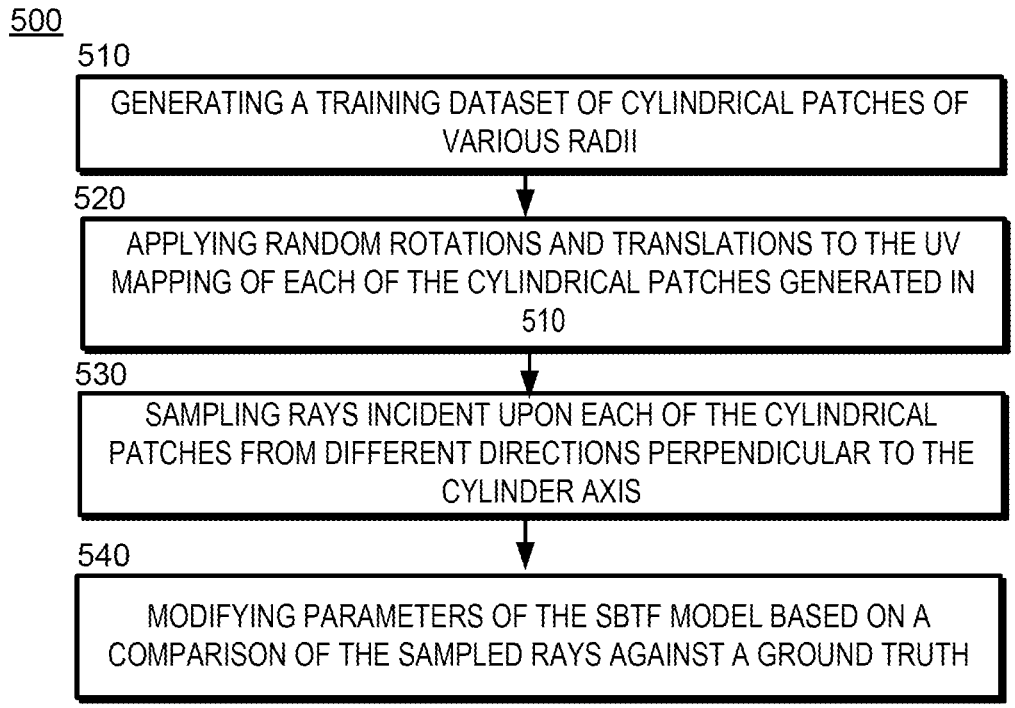
FIG. 5 depicts a method for training the SBTF model of FIG. 3, according to certain embodiments described herein.

FIG. 5 depicts a method for training the SBTF model of FIG. 3, according to certain embodiments described herein. One or more computing devices (e.g., the scene modeling system 110 or the individual subsystems contained therein) implement operations depicted in FIG. 5. For illustrative purposes, the method 500 is described with reference to certain examples depicted in the figures. Other implementations, however, are possible.

At block 510, the method 500 involves generating a training dataset 108 of cylindrical patches of various radii. The training subsystem 116 trains the SBTF model 105 on queries of materials 102 applied to surfaces of varying curvature. Cylindrical patches have zero curvature along a cylinder axis and have a trivially controllable curvature in a perpendicular direction. The training subsystem 116 generates the training dataset 108 of cylindrical patches of different radius and applies a material 102 microstructure to the patches. The cylindrical patches function as bounding geometries 103. In other embodiments, instead of cylindrical patches, the training dataset 108 can include a database of general shapes. However, cylindrical patches are preferable because using other shapes, in some instances, can cause various discontinuities and distortions in a UV mapping. In certain embodiments, the materials 102 applied to the patches corresponds to the materials 102 that are selectable by the user for rendering as a surface of a 3D virtual object 101.

At block 520, the method 500 involves applying random rotations and translations to a UV mapping of each of the cylindrical patches generated in block 510. The generated material 102 is completely contained by the cylindrical surface, which acts as a bounding geometry 103. In some instances, the cylinder patch is sampled from a smaller region within the cylinder patch to avoid intersections near a boundary of the cylinder patch.

At block 530, the method 500 involves sampling rays incident upon each of the cylindrical patches from different directions perpendicular to the cylinder axis. The training subsystem 116 can determine a curvature along the sampled rays as a reciprocal of the cylindrical patch radius. Because random UV rotations and translations have been applied in block 520, the SBTF model 105 is trained for all combinations of texture coordinates and camera directions in a local coordinate frame for each neural material 102. In some embodiments, the training subsystem 116 samples the ray in a hemisphere above a horizon to determine a light direction associated with the sampled ray. In other embodiments, the training subsystem 116 samples the ray in a sphere to determine a light direction associated with a sampled ray, because light can come from below the horizon due to the curvature of the cylindrical patch.

At block 540, the method 500 involves modifying parameters of the SBTF model 105 based on a comparison of the sampled rays to a ground truth. For example, the training subsystem 116 compares a silhouette cosine 317 of the sampled rays to a corresponding ground truth silhouette cosine 317. To calculate a ground truth silhouette cosine 317 for a sampled ray, the training subsystem 116 performs a binary search to find an angle at which the sampled ray exactly grazes the material 102 boundary. In certain embodiments, the training subsystem 116 trains the SBTF model 105 using the ground truth silhouette cosine 317 information and a ground truth UV displacement. To generate a ground truth set of materials 102 applied to cylinders (or other objects of known curvature), in some instances, the training subsystem 116 extracts a heightfield from real world data and, using the heightfield, re-renders the real-world materials 102 applied to different cylinder patches. In certain embodiments, the training subsystem 116 applies a Gaussian blur to neural materials 102 in initial stages of a training period and, as the training continues, continually decreases a standard deviation of the blur. In some instances, the training subsystem 116 calculates a loss (e.g., an L1 or L2 loss, or a combined weighted loss of L1 and L2 losses) and trains the SBTF model 105 to minimize the loss. In some instances, the training subsystem 116 determines an L1 loss for the offset 325 vector predicted by the SBTF model 105 by comparing predicted offset 325 vectors and ground truth offset vectors in a texture space. In some embodiments, the training subsystem 116 trains the SBTF model 105 by learning an appearance in a semi-unsupervised manner based on color values and alpha (opacity) losses. In certain examples, the training dataset 108 includes a predetermined number (e.g., 2400) different cylindrical surface patches with a predetermined number (e.g., 65,536) of queries for each patch.

Figure 6:
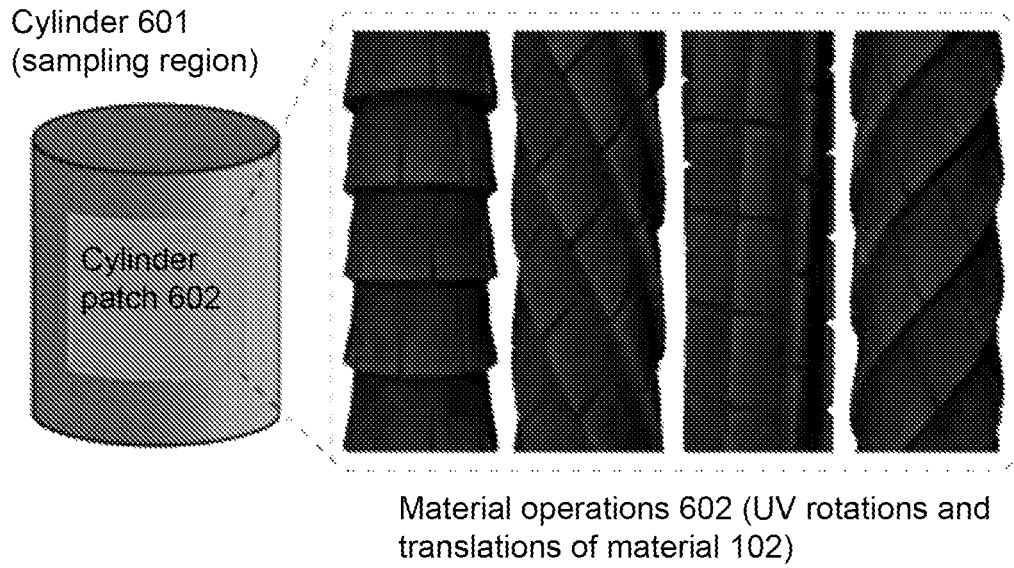
FIG. 6 illustrates generation of a cylindrical patch for use in FIG. 5 for training the SBTF model, according to certain embodiments described herein.

FIG. 6 illustrates generation of a cylindrical patch for use in FIG. 5 for training the SBTF model, according to certain embodiments described herein. As depicted in FIG. 6, a cylinder patch 602 is determined from cylinder 601 sampling region and various material operations 602 are performed on a material 102 in the cylinder patch 602. The material operations 602 can include UV rotations and translations of the material 102, as depicted in FIG. 6. The cylinder patch 602 is sampled from the sampling region to avoid intersecting of the material 102 near a boundary of the cylinder 601. For example, the cylinder patch 602 is not sampled at locations near edges of the cylinder 601 to avoid intersecting the edges of the cylinder 601.

Figure 7:
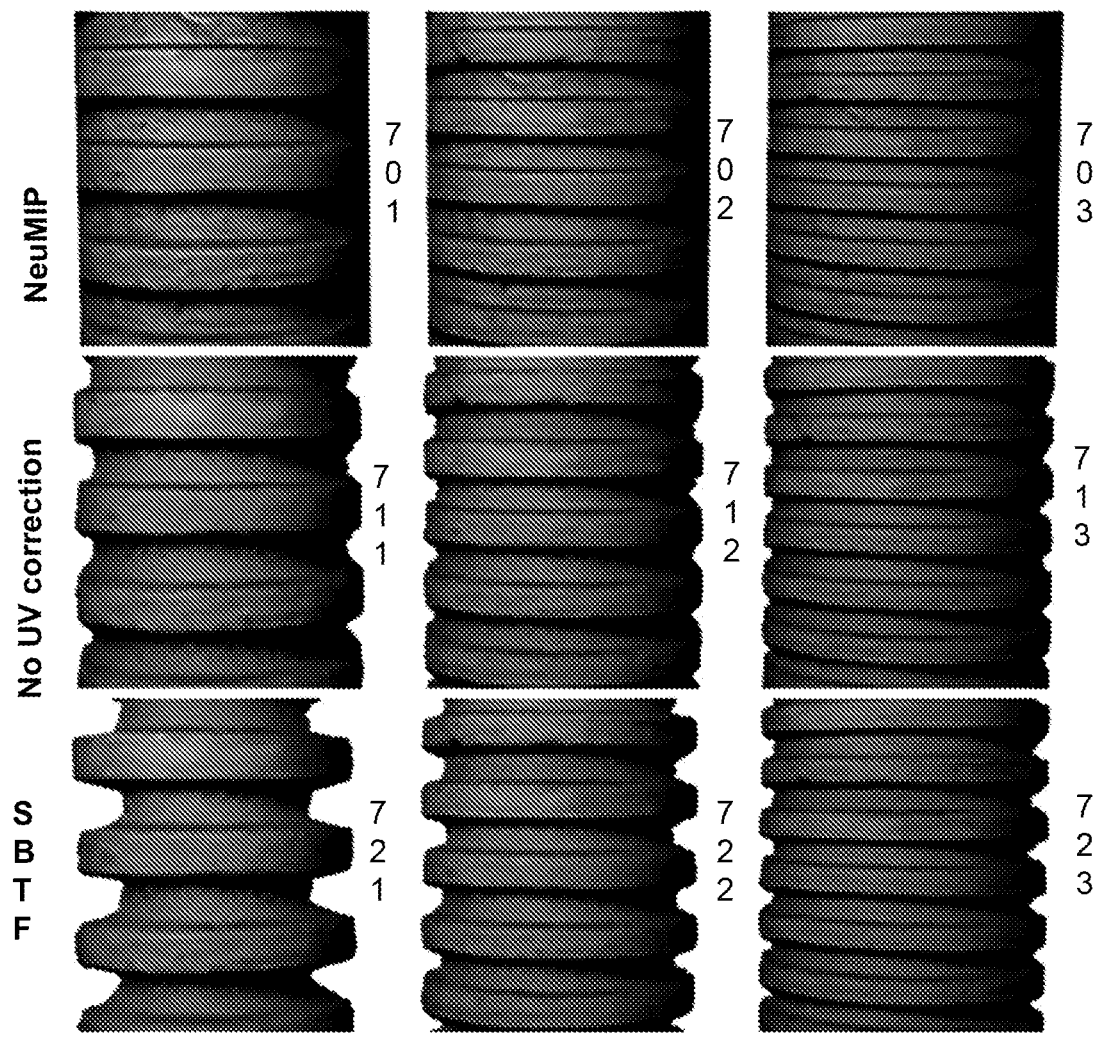
FIG. 7 illustrates a comparison between results of the SBTF model described herein when UV correction is not applied and results of the SBTF model described herein when UV correction is applied, according to certain embodiments described herein.

FIG. 7 illustrates a comparison between results of the SBTF model described herein when UV correction is not applied and results of the SBTF model described herein when UV correction is applied, according to certain embodiments described herein. FIG. 7 illustrates output images 107 generated by a NeuMIP model, depicted in images 701, 702, and 703. FIG. 7 also illustrates output images 107 generated by the SBTF model 105 described herein if UV offset (curvature correction) is not applied, depicted in images 711, 712, and 713. FIG. 7 further illustrates output images 107 generated by the SBTF model 105 described herein including UV offset (curvature correction), depicted in images 721, 722, and 723. Further the 3D virtual objects 101 in images 701, 711, 721 correspond to a same object at a first scale, the 3D virtual objects 101 in images 702, 712, 722 correspond to the same object at a second scale, and the 3D virtual objects 101 in images 703, 713, and 673 correspond to the same object at a third scale. FIG. 7 thus illustrates an importance of curvature correction when scaling an object. As previously described, curvature corresponds to a radius of an osculating circle. As shown in images 701, 702, 703, and the grooves of the textured surface material are not accurately depicted when compared to the SBTF model 105 without UV correction (images 711, 712, and 713) for different 3D virtual object 101 scales. Specifically, the grooves depicted in output images 107 (701, 702, 703) are too shallow when compared to the images 711, 712, and 713. Further, the SBTF model 105 having the UV correction feature (images 721, 722, 723) results in a more accurate depiction of grooves of the material surface, especially at the edges, both when compared to the NeuMIP model as well as the SBTF model 105 without the UV correction feature. Specifically, the grooves depicted in output images 701/711, 702/712, and 703/713 are shallower when compared to the grooves of the surface material 102 in images 721, 722, and 723.

Figure 8:
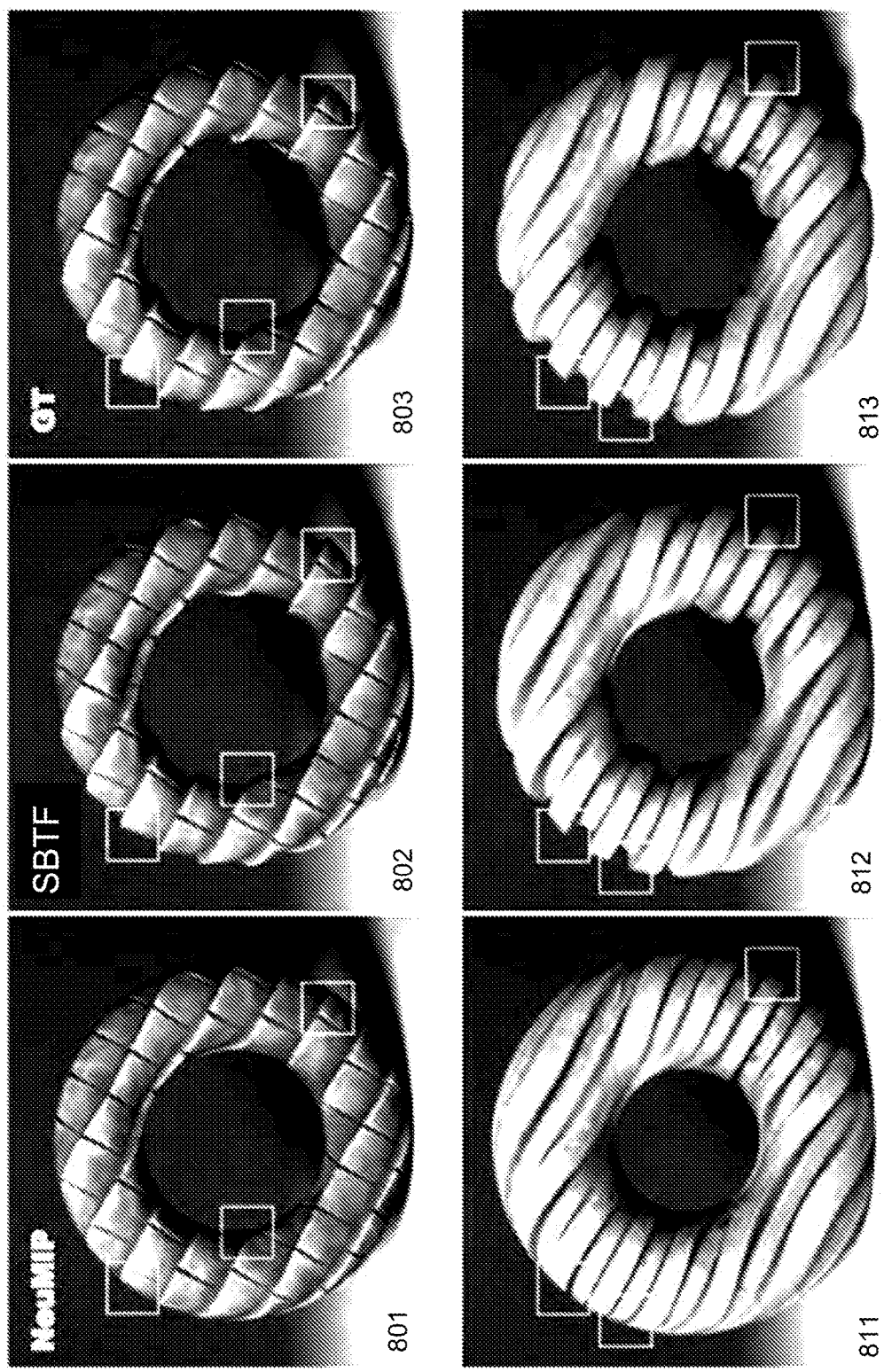
FIG. 8 illustrates another comparison between results of the SBTF model described herein and NeuMIP models, according to certain embodiments described herein.

FIG. 8 illustrates another comparison between results of the SBTF model 105 described herein and NeuMIP models, according to certain embodiments described herein. Images 801 and 811 depict output images 107 of a NeuMIP (neural) model and images 802 and 812 depict output images 107 of the SBTF model 105 described herein. These images 801, 802, 811, and 812 are compared against ground truth images 803 and 813. Images 801, 802, 803 correspond to a first material 102 and images 811, 812, and 813 correspond to a second material 102. A set of neural materials 102 are applied to a simple and smooth taurus mesh that is subdivided and displaced. In certain embodiments, the ground truth (GT) is computed by a fine tessellation and displacement method. As shown in FIG. 8 (compare the edges of the 3D objects within selected box regions), the SBTF model 105 (images 802 and 812) is able to render silhouettes that retain fine detail from geometric from geometric displacement, while the NeuMIP model (images 801 and 811) fails to produce any details, resulting in smooth edges and a flatter look. Unlike the NeuMIP model that produces smooth silhouettes without any details from displacements at grazing ray angles, the SBTF model 105 herein successfully renders fine-level geometric displacements that more closely match the ground truth.

Figure 9:
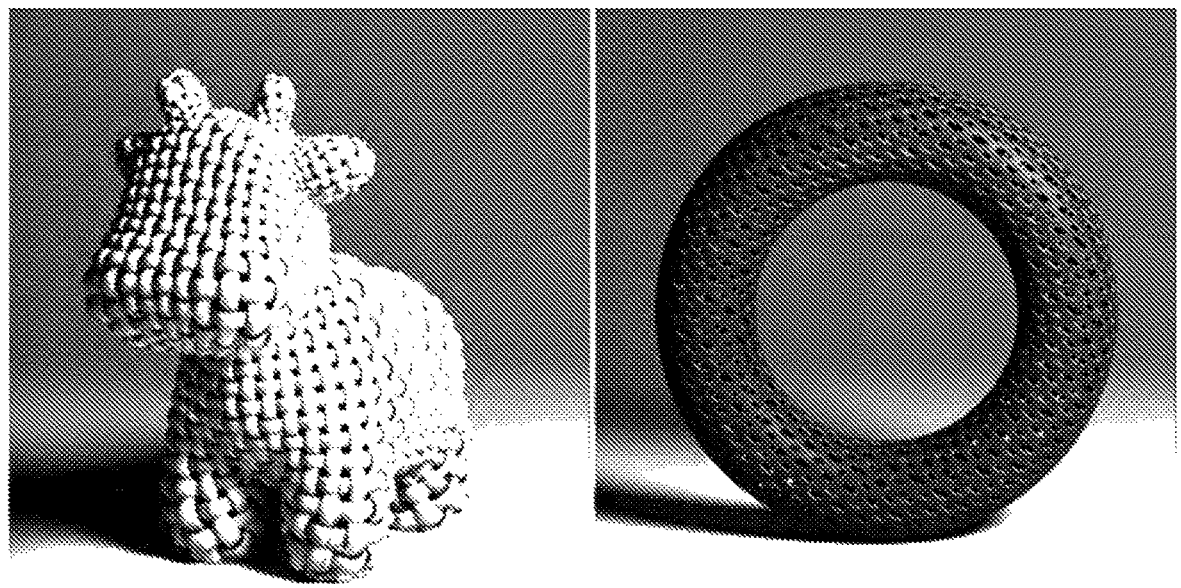
FIG. 9 illustrates results of the SBTF model described herein for rendering particular textured material surfaces, according to certain embodiments described herein.

FIG. 9 illustrates results of the SBTF model 105 described herein for rendering particular textured material 102 surfaces, according to certain embodiments described herein. As illustrated in FIG. 9, the SBTF model 105 supports rendering of surface materials 102 including non-heightfield and see-through materials 102. The basket weave 901 material, for example, includes weaves running horizontally and vertically. Accordingly, the basket weave 901 material does not comprise a heightfield because the threads of the weaves superimpose on top of each other. Nevertheless, the SBTF model 105 is able to represent this basket weave 901 material accurately, as depicted in FIG. 9. The perforated leather 902 material also violates the heightfield assumption but, as depicted in FIG. 9, the SBTF model 105 is able to represent the perforated leather 902 material accurately. In certain embodiments, for rendering surface materials 102 that do not conform to the heightfield assumption such as materials 901 and 902 depicted in FIG. 9, the SBTF model 105 is configured to predict an opacity (alpha) value directly instead of calculating a silhouette cosine.

Figure 10:
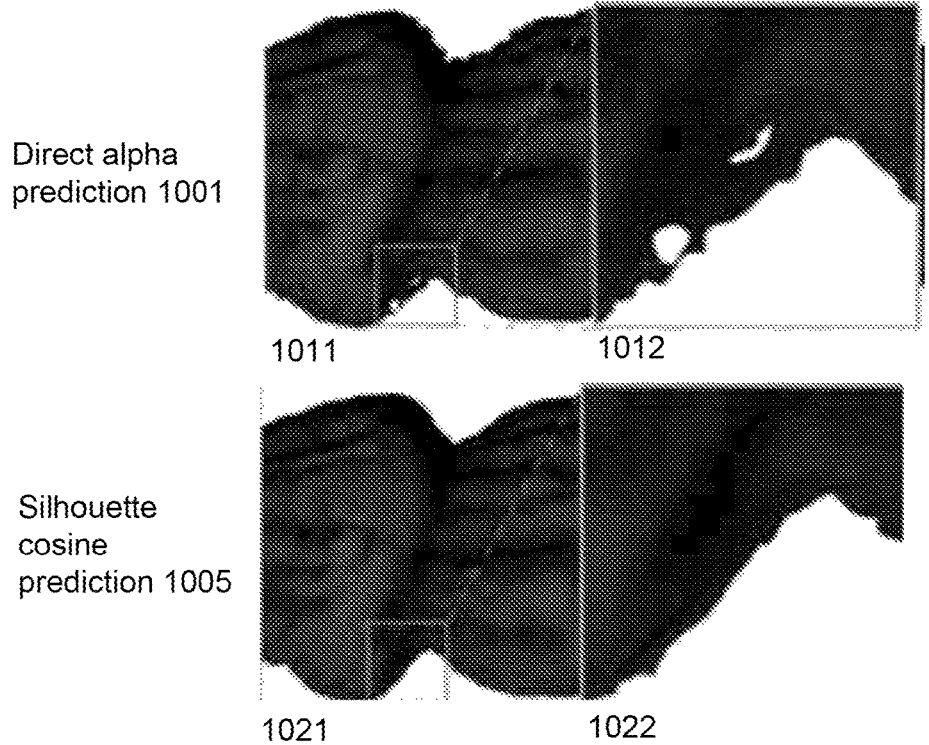
FIG. 10 illustrates advantages of using a silhouette cosine calculation compared to a direct alpha calculation in an alpha network of the model of FIG. 3, according to certain embodiments described herein.

FIG. 10 illustrates advantages of using a silhouette cosine calculation compared to a direct alpha calculation in an alpha network of the model of FIG. 3, according to certain embodiments described herein. In certain embodiments described herein, the alpha network 310 of the SBTF model 105 is configured to calculate an opacity (alpha) 318 value directly, while, in other embodiments, the SBTF model 105 is configured to calculate a silhouette cosine 317 and determine the opacity (alpha) 318 value based on the silhouette cosine 317 and a camera angle. FIG. 10 depicts results (images 1011 and 1012) of using a direct alpha prediction 1001 and results (images 1021 and 1022) of using a silhouette cosine prediction 1005. Image 1012 is a zoomed image corresponding to the boxed region of image 1011 and image 1022 is a zoomed image corresponding to the boxed region of image 1021. As shown in images 1011 and 1012, the results of the direct alpha prediction 1001 may result in silhouette regions (see image 1012) that include artifacts such as holes and jagged edges. As shown in images 1021 and 1022, using the silhouette cosine calculation may produce output images 107 that do not include such artifacts. As previously described in FIG. 9, some materials, such as those that include transparency, produce better resulting output images 107 when the direct alpha prediction 1001 method is used instead of the silhouette cosine prediction 1005 method, because the silhouette cosine is binary.

Examples of Computing Environments for Implementing Certain Embodiments

Figure 11:
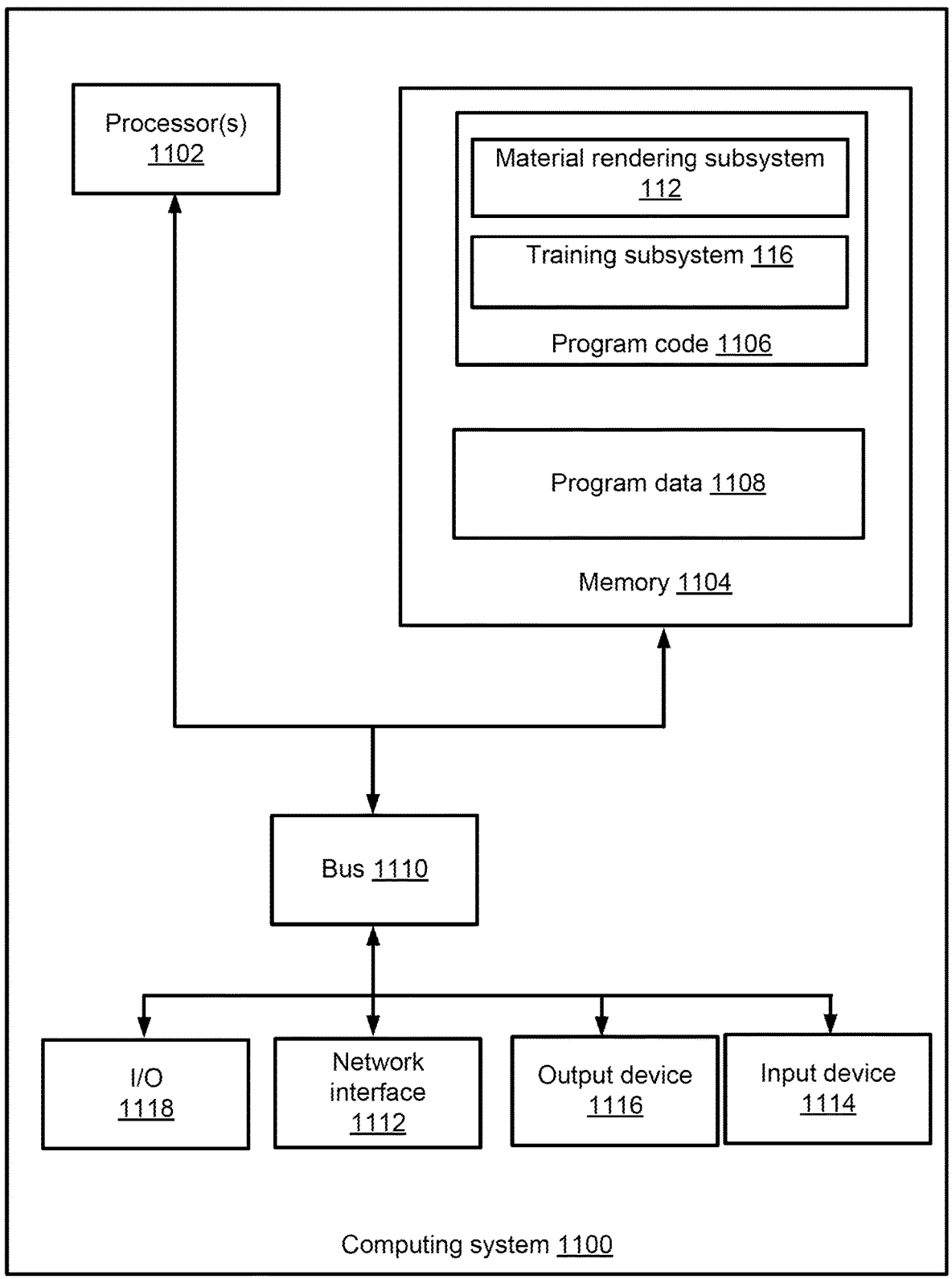
FIG. 11 depicts an example of a computing system that performs certain operations described herein, according to certain embodiments disclosed herein.

Any suitable computer system or group of computer systems can be used for performing the operations described herein. For example, FIG. 11 depicts an example of a computer system 1100. The depicted example of the computer system 1100 includes a processing device 1102 communicatively coupled to one or more memory components 1104. The processing device 1102 executes computer-executable program code stored in a memory components 1104, accesses information stored in the memory component 1104, or both. Execution of the computer-executable program code causes the processing device to perform the operations described herein. Examples of the processing device 1102 include a microprocessor, an application-specific integrated circuit ("ASIC"), a field-programmable gate array ("FPGA"), or any other suitable processing device. The processing device 1102 can include any number of processing devices, including a single processing device.

The memory components 1104 includes any suitable non-transitory computer-readable medium for storing program code 1106, program data 1108, or both. A computer-readable medium can include any electronic, optical, magnetic, or other storage device capable of providing a processing device with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C #, Visual Basic, Java, Python, Perl, JavaScript, and ActionScript. In various examples, the memory components 504 can be volatile memory, non-volatile memory, or a combination thereof.

The computer system 1100 executes program code 806 that configures the processing device 1102 to perform one or more of the operations described herein. Examples of the program code 1106 include, in various embodiments, the scene modeling system 110 (including the surface material rendering subsystem 112 and the training subsystem 116) of FIG. 1, which may include any other suitable systems or subsystems that perform one or more operations described herein (e.g., one or more neural networks, encoders, attention propagation subsystem and segmentation subsystem). The program code 1106 may be resident in the memory components 1104 or any suitable computer-readable medium and may be executed by the processing device 1102 or any other suitable processor.

The processing device 1102 is an integrated circuit device that can execute the program code 1106. The program code 1106 can be for executing an operating system, an application system or subsystem, or both. When executed by the processing device 1102, the instructions cause the processing device 1102 to perform operations of the program code 1106. When being executed by the processing device 1102, the instructions are stored in a system memory, possibly along with data being operated on by the instructions. The system memory can be a volatile memory storage type, such as a Random Access Memory (RAM) type. The system memory is sometimes referred to as Dynamic RAM (DRAM) though need not be implemented using a DRAM-based technology. Additionally, the system memory can be implemented using non-volatile memory types, such as flash memory.

In some embodiments, one or more memory components 1104 store the program data 1108 that includes one or more datasets described herein. In some embodiments, one or more of data sets are stored in the same memory component (e.g., one of the memory components 1104). In additional or alternative embodiments, one or more of the programs, data sets, models, and functions described herein are stored in different memory components 1104 accessible via a data network. One or more buses 1110 are also included in the computer system 1100. The buses 1110 communicatively couple one or more components of a respective one of the computer system 1100.

In some embodiments, the computer system 1100 also includes a network interface device 1112. The network interface device 1112 includes any device or group of devices suitable for establishing a wired or wireless data connection to one or more data networks. Non-limiting examples of the network interface device 1112 include an Ethernet network adapter, a modem, and/or the like. The computer system 1100 is able to communicate with one or more other computing devices via a data network using the network interface device 1112.

The computer system 1100 may also include a number of external or internal devices, an input device 1114, a presentation device 1116, or other input or output devices. For example, the computer system 1100 is shown with one or more input/output ("I/O") interfaces 1118. An I/O interface 1118 can receive input from input devices or provide output to output devices. An input device 1114 can include any device or group of devices suitable for receiving visual, auditory, or other suitable input that controls or affects the operations of the processing device 1102. Non-limiting examples of the input device 1114 include a touchscreen, a mouse, a keyboard, a microphone, a separate mobile computing device, etc. A presentation device 1116 can include any device or group of devices suitable for providing visual, auditory, or other suitable sensory output. Non-limiting examples of the presentation device 1116 include a touchscreen, a monitor, a speaker, a separate mobile computing device, etc.

Although FIG. 11 depicts the input device 1114 and the presentation device 1116 as being local to the computer system 1100, other implementations are possible. For instance, in some embodiments, one or more of the input device 1114 and the presentation device 1116 can include a remote client-computing device that communicates with computing system 1100 via the network interface device 1112 using one or more data networks described herein.

Embodiments may comprise a computer program that embodies the functions described and illustrated herein, wherein the computer program is implemented in a computer system that comprises instructions stored in a machine-readable medium and a processing device that executes the instructions to perform applicable operations. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computer systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

Figure 12:
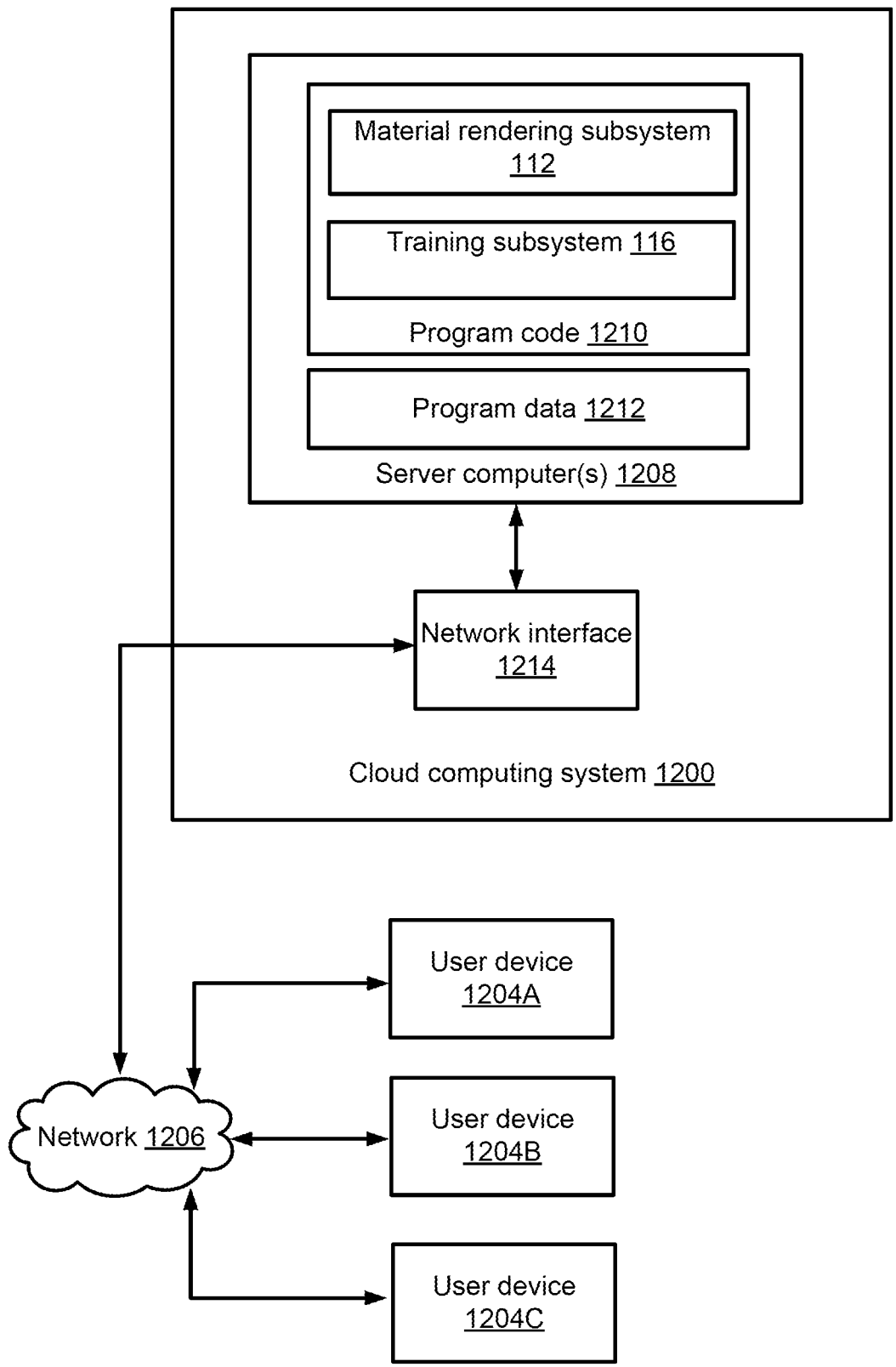
FIG. 12 depicts an example of a cloud computing system that performs certain operations described herein, according to certain embodiments disclosed herein.

In some embodiments, the functionality provided by computer system 1100 may be offered as cloud services by a cloud service provider. For example, FIG. 12 depicts an example of a cloud computer system 1200 offering a service for rendering textured surfaces on a 3D virtual object 101 using an SBTF model 105, that can be used by a number of user subscribers using user devices 1204A, 1204B, and 1204C across a data network 1206. The cloud computer system 1200 performs the processing to provide the service of rendering textured surfaces on a 3D virtual object 101 using an SBTF model 105 to generate an output image 107. The cloud computer system 1200 may include one or more remote server computers 1208.

The remote server computers 1208 include any suitable non-transitory computer-readable medium for storing program code 1210 (e.g., the surface material rendering subsystem 112 and the training subsystem 116 of FIG. 1) and program data 1212, or both, which is used by the cloud computer system 1200 for providing the cloud services. A computer-readable medium can include any electronic, optical, magnetic, or other storage device capable of providing a processing device with executable instructions or other program code. Non-limiting examples of a computer-readable medium include a magnetic disk, a memory chip, a ROM, a RAM, an ASIC, optical storage, magnetic tape, or other magnetic storage, or any other medium from which a processing device can read instructions. The instructions may include processor-specific instructions generated by a compiler or an interpreter from code written in any suitable computer-programming language, including, for example, C, C++, C #, Visual Basic, Java, Python, Perl, JavaScript, and ActionScript. In various examples, the server computers 908 can include volatile memory, non-volatile memory, or a combination thereof.

One or more of the server computers 1208 execute the program code 1210 that configures one or more processing devices of the server computers 1208 to perform one or more of the operations that render textured surfaces on a 3D virtual object 101 using an SBTF model 105 to generate an output image 107. As depicted in the embodiment in FIG. 12, the one or more servers providing the service for rendering textured surfaces on a 3D virtual object 101 using an SBTF model 105 may implement the surface material rendering subsystem 112 and the training subsystem 116. Any other suitable systems or subsystems that perform one or more operations described herein (e.g., one or more development systems for configuring an interactive user interface) can also be implemented by the cloud computer system 1200.

In certain embodiments, the cloud computer system 1200 may implement the services by executing program code and/or using program data 1212, which may be resident in a memory component of the server computers 1208 or any suitable computer-readable medium and may be executed by the processing devices of the server computers 1208 or any other suitable processing device.

In some embodiments, the program data 1212 includes one or more datasets and models described herein. In some embodiments, one or more of data sets, models, and functions are stored in the same memory component. In additional or alternative embodiments, one or more of the programs, data sets, models, and functions described herein are stored in different memory components accessible via the data network 1206.

The cloud computer system 1200 also includes a network interface device 1214 that enable communications to and from cloud computer system 1200. In certain embodiments, the network interface device 1214 includes any device or group of devices suitable for establishing a wired or wireless data connection to the data networks 1206. Non-limiting examples of the network interface device 1214 include an Ethernet network adapter, a modem, and/or the like. The service for rendering textured surfaces on a 3D virtual object 101 using an SBTF model 105 is able to communicate with the user devices 1204A, 1204B, and 1204C via the data network 1206 using the network interface device 1214.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included within the scope of claimed embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computer system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as an open and inclusive language that does not foreclose devices adapted to or configured to perform additional tasks or steps. Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Additionally, the use of "based on" is meant to be open and inclusive, in that, a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method comprising:
    accessing a three-dimensional (3D) scene including one or more 3D objects;
    applying a silhouette bidirectional texture function (SBTF) model to a 3D object to generate an output image of a textured material rendered as a surface of the 3D object, wherein applying the SBTF model comprises:
        determining a bounding geometry for the surface of the 3D object; and
        for each pixel of the output image, determining a pixel value based on the bounding geometry wherein the pixel value comprises a reflectance value, and wherein determining the pixel value for each pixel comprises:
        projecting a ray through the pixel into the scene;
        determining that the ray encounters the bounding geometry or does not encounter the bounding geometry;
        responsive to determining that the ray encounters the bounding geometry, determining the reflectance value for the pixel based in part on a curvature value of the ray, the curvature value filtered by taking a minimum curvature along a curve on the bounding geometry, and applying the pixel to the surface of the 3D object; and
    displaying, via a user interface, the output image based on the determined pixel values.

2. The method of claim 1, wherein the pixel value further comprises an opacity value, and determining the pixel value for each pixel further comprises:
    responsive to determining that the ray does not encounter the bounding geometry, assign an opacity value of zero to the pixel.

3. The method of claim 1, wherein determining the reflectance value further comprises:

determining a UV offset for the pixel based on a location on a surface of the bounding geometry; and determining the reflectance value based on the location on the surface of the bounding geometry and the UV offset.

4. The method of claim 1, wherein the SBTF model comprises:

an alpha network configured to determine an opacity value, wherein determining that the ray encounters the bounding geometry comprises determining a non-zero opacity value, wherein determining that the ray does not encounter the bounding geometry comprises determining a zero opacity value.

5. The method of claim 4, wherein determining the opacity value further comprises:

determining a silhouette cosine value;

if a cosine of the ray is less than the silhouette cosine value, determining a zero value for the opacity value; or if the cosine of the ray is greater than or equal to the silhouette cosine value, determining a value of one for the opacity value.

6. The method of claim 1, further comprising training the SBTF model, wherein training the SBTF model comprises:

generating a training dataset of cylindrical patches of varying radii;

applying, to the cylindrical patches of the training dataset, one or more of random rotations, random camera directions, random light directions, or random translations to a UV mapping; and sampling rays incident upon each of the cylindrical patches from different directions perpendicular to a cylinder axis.

7. A system comprising:

a memory component; and a processing device coupled to the memory component, the processing device to perform operations comprising:

accessing a three-dimensional (3D) scene including one or more 3D objects;

applying a silhouette bidirectional texture function (SBTF) model to a 3D object to generate an output image of a textured material rendered as a surface of the 3D object, wherein the SBTF model comprises:

an alpha network configured to determine an opacity value for a pixel of the output image based at least in part on a bounding geometry of the surface of the 3D object;

an offset network configured to determine a reflectance value for the pixel wherein the offset network determines the reflectance value for the pixel by:

projecting a ray through the pixel into the scene;

determining the ray encounters the bounding geometry of the surface of the 3D object or does not encounter the bounding geometry of the bounding geometry;

responsive to determining that the ray encounters the bounding geometry, determining the reflectance value for the pixel based in part on a curvature value of the ray, the curvature value filtered by taking a minimum curvature along a curve on the bounding geometry, and applying the pixel to the surface of the 3D object; and a color network configured to determine a reflectance value for the pixel if the opacity is a non-zero value; and displaying, via a user interface, the output image based on the determined pixel values.

8. The system of claim 7, wherein one or more of the alpha network, the offset network, and the color network comprise a fully connected network including a multi-layer perceptron (MLP) that uses a rectified linear unit (ReLU) activation function.

9. The system of claim 7, wherein the non-zero opacity value indicates that a ray projected through the pixel into the scene encounters the bounding geometry, wherein a zero opacity value indicates that the ray does not encounter the bounding geometry.

10. The system of claim 7, wherein the color network does not determine the reflectance value if the opacity value is zero.

11. The system of claim 7, wherein determining the opacity value comprises:

determining a silhouette cosine value;

if a cosine of a ray projected through the pixel into the scene is less than the silhouette cosine value, determining a zero value for the opacity value; or if the cosine of the ray is greater than or equal to the silhouette cosine value, determining a value of one for the opacity value.

12. The system of claim 7, wherein the operations further comprise training the SBTF model, wherein training the SBTF model comprises:

generating a training dataset of cylindrical patches of varying radii;

applying, to the cylindrical patches of the training dataset, random rotations and translations to a UV mapping; and sampling rays incident upon each of the cylindrical patches from different directions perpendicular to a cylinder axis.

13. A non-transitory computer-readable medium storing executable instructions, which when executed by a processing device, cause the processing device to perform operations comprising:

accessing a three-dimensional (3D) scene including one or more 3D objects;

applying a silhouette bidirectional texture function (SBTF) model to a 3D object to generate an output image of a textured material rendered as a surface of the 3D object, wherein applying the SBTF model comprises:

determining a bounding geometry for the surface of the 3D object; and for each pixel of the output image, determining a silhouette cosine value based on a location on a surface of the bounding geometry of a ray projected through the pixel into the scene;

determine an opacity value based on comparing the silhouette cosine value to a cosine value of the ray; and determine a pixel value based at least in part on the opacity value and a reflectance value wherein determining the reflectance value comprises:

determining the ray encounters the bounding geometry or does not encounter the bounding geometry;

responsive to determining that the ray encounters the bounding geometry, determining the reflectance value for the pixel based in part on a curvature value of the ray, the curvature value filtered by taking a minimum curvature along a curve on the bounding geometry, and applying the pixel to the surface of the 3D object; and displaying, via a user interface, the output image based on the determined pixel values.

14. The non-transitory computer-readable medium of claim 13, wherein the SBTF model determines a zero value for the opacity value if a cosine of the ray is less than the silhouette cosine value and wherein the SBTF model determines a non-zero value for the opacity value if the cosine of the ray is greater than or equal to the silhouette cosine value.

15. The non-transitory computer-readable medium of claim 14, wherein the non-zero opacity value indicates that the ray encounters the bounding geometry, and wherein the zero opacity value indicates that the ray does not encounter the bounding geometry.

16. The non-transitory computer-readable medium of claim 15, wherein the reflectance value comprises a Red-Green-Blue (RGB) color value.

17. The non-transitory computer-readable medium of claim 13, the operations further comprising training the SBTF model, wherein training the SBTF model comprises:
generating a training dataset of cylindrical patches of varying radii;
applying, to the cylindrical patches of the training dataset, random rotations and translations to a UV mapping; and
sampling rays incident upon each of the cylindrical patches from different directions perpendicular to a cylinder axis.

* * * * *